US012757291B2

(12) United States Patent
Mihály et al.

(10) Patent No.: US 12,757,291 B2
(45) Date of Patent: Oct. 6, 2026

(54) HANDLING OF SESSION CONTEXT

(71) Applicant: Telefonaktiebolaget LM Ericsson (publ), Stockholm (SE)

(72) Inventors: Attila Mihály, Dunakeszi (HU); Magnus Hallenstål, Täby (SE); Magnus Olsson, Klagshamn (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 278 days.

(21) Appl. No.: 18/743,199

(22) Filed: Jun. 14, 2024

(65) Prior Publication Data

US 2024/0341009 A1 Oct. 10, 2024

Related U.S. Application Data

(63) Continuation of application No. 17/619,325, filed as application No. PCT/EP2020/062046 on Apr. 30, 2020, now Pat. No. 12,048,054.

(Continued)

(51) Int. Cl.
*H04W 76/30* (2018.01)
*H04W 76/12* (2018.01)
*H04W 76/19* (2018.01)

(52) U.S. Cl.
CPC ........... *H04W 76/30* (2018.02); *H04W 76/12* (2018.02); *H04W 76/19* (2018.02)

(58) Field of Classification Search
CPC ...... H04W 76/12; H04W 76/30; H04W 76/19
See application file for complete search history.

(56) References Cited

U.S. PATENT DOCUMENTS 12,048,054 B2 * 7/2024 Mihály ................. H04W 76/30
2018/0270715 A1 9/2018 Lee et al.

(Continued)

FOREIGN PATENT DOCUMENTS

CN 109429364 A 3/2019
CN 109429366 A 3/2019

(Continued)

OTHER PUBLICATIONS

Ericsson , "Specification of SMF behaviour at PDU Session setup and modification failure", SA WG2 Meeting #134, S2-1906961,Sapporo, Japan, Jun. 24-28, 2019, 1-25.

(Continued)

*Primary Examiner* — Elton Williams
(74) *Attorney, Agent, or Firm* — Murphy, Bilak & Homiller, PLLC

(57) ABSTRACT

A network provides PDU sessions between wireless devices and data networks. UPFs in the network handle the user planes of these PDU sessions, while SMFs in the network manage the PDU sessions. The SMFs have dedicated interfaces for signaling sessions to the UPFs. In the occasion that managing of a PDU session has to be transferred from one SMF to another SMF, the first SMF has to release the signalling session with the UPF for the PDU session, and a second SMF has to re-establish the signaling session with the UPF for the same PDU session. To avoid that during the transfer of the management responsibility transfer the wireless device experiences a hick-up in the PDU session the first SMS includes a control element in the release message to the UPF, indicating to the UPF that the signaling session for the PDU session will be re-established by a second SMF, and that the UPF shall continue the handling of the PDU session till re-establishment.

26 Claims, 19 Drawing Sheets

Related U.S. Application Data

(60) Provisional application No. 62/862,223, filed on Jun. 17, 2019.

(56) References Cited

U.S. PATENT DOCUMENTS

| | | | |
|---|---|---|---|
| 2019/0059067 | A1 | 2/2019 | Lee et al. |
| 2019/0098536 | A1 | 3/2019 | Qiao et al. |

FOREIGN PATENT DOCUMENTS

| | | | |
|---|---|---|---|
| CN | 109644419 | A | 4/2019 |
| EP | 3447997 | A1 | 2/2019 |

OTHER PUBLICATIONS

Ericsson , "Updates to the SMF context transfer procedure", 3GPP TSG-SA WG2 Meeting #134, S2-1906972, (revision of S2-19xxxx), Sapporo, Japan, Jun. 24-28, 2019, 1-5.

Samsung , "Update CN-initiated selective deactivation of UP connection of an existing PDU Session procedure", 3GPP TSG-SA2 Meeting #13,4 S2-1907844, Sapporo, Japan, Jun. 24-28, 2019, 1-3.

3GPP, "3GPP TS 23.502 V16.4.0", 3rd Generation Partnership Project; Technical Specification Group Services and System Aspects; Procedures for the 5G System (5GS); Stage 2 (Release 16), Mar. 2020, 1-582.

3GPP , "3rd Generation Partnership Project; Technical Specification Group Core Network and Terminals; Interface between the Control Plane and the User Plane Nodes; Stage 3 (Release 15)", 3GPP TS 29.244 V15.5.0, Mar. 2019, 1-198.

3GPP , "3rd Generation Partnership Project; Technical Specification Group Services and System Aspects; Procedures for the 5G System; Stage 2 (Release 16)", 3GPP TS 23.502 V16.0.2, Apr. 2019, 1-419.

Ericsson , "SMF context transfer", 3GPP TSG-SA WG2 Meeting #133, S2-1906744, (revision of S2-196729), Reno, NV, USA, May 13-17, 1-4.

Ericsson , "Updates to the SMF context transfer procedure", 3GPP TSG-SA WG2 Meeting #134, S2-19xxxxx, (revision of S2-19xxxx), Sapporo, Japan, Jun. 24-28, 1-4.

Huawei , et al., "TS 23.501: Network topology consideration", 3GPP TSG SA WG2 Meeting #121, S2-173135, Hangzhou, China, May 15-19, 2017, 1-11.

* cited by examiner

HANDLING OF SESSION CONTEXT

BACKGROUND

A wireless communication network interconnects a wireless device to a data network (DN), e.g., the Internet. Interconnected in this way, the wireless device may establish a protocol data unit (PDU) session with the DN. A session manager in the wireless communication network (e.g., a session management function, SMF, in a 5G network) manages this PDU session. But, at some point during the lifetime of the PDU session, the wireless communication network may need to transfer responsibility for managing the PDU session from one session manager to another. This complicates the session manager's interaction with a user plane entity (e.g., a user plane function, UPF, in a 5G network) that handles the user plane path of the PDU session.

The initial session manager in this regard will have previously established a signalling session (e.g., an N4 session in a 5G network) with the user plane entity for communication related to the device's PDU session. When session management responsibility is transferred to the new session manager, communication related to the PDU session will need to take place over a signalling session established between the new session manager and the user plane entity. Realizing effective re-establishment of the same signalling session, but with the new session manager instead of the old session manager, proves complicated, especially in a way that achieves reduces signalling overhead, minimizes processing complexity, and/or maintains backward compatibility. For example, introducing new procedures between the user plane entity and a session manager specifically for modifying the signalling session to account for session manager transfer would add signalling overhead and processing complexity, while jeopardizing backwards compatibility. Moreover, re-establishing the same signalling session proves complicated to do in a way that maintains service continuity.

Similar challenges arise for wireless devices that transition between idle and connected modes, which prompts removal and establishment of signalling sessions between the user plane entity and the session manager.

SUMMARY

According to some embodiments herein, a session management function (SMF) requests a user plane function (UPF) to release a signalling session (e.g., an N4 session) between the SMF and UPF, but also indicates to the UPF that the signalling session will be re-established, e.g., by the same or a different SMF. The indication may for instance comprise control signaling included in or otherwise associated with the session release request. Regardless, based on this indication, the UPF in some embodiments preserves information from the signalling session's context, despite the request to release the signalling session. The UPF may then exploit this preserved information in the interim between the request to release the signalling session and the signalling session's re-establishment. The UPF may for instance route or buffer data packets in the interim using the preserved information, e.g., so as to avoid packet loss or delay and thereby maintain service continuity. The UPF may alternatively or additionally exploit the preserved information for handling or speeding up re-establishment of the signalling session, e.g., such that the signalling session as re-established has the same session identifier, the same Internet Protocol (IP) address, an updated packet counter value, etc.

Some embodiments thereby effectively realize signalling session re-establishment using control signalling associated with session release, e.g., so as to avoid introducing dedicated session modification procedures. In doing so, some embodiments advantageously preserve service continuity, reduce signalling overhead, reduce the number of states stored, minimize processing complexity, and/or maintain backward compatibility with respect to the interaction between the SMF and UPF.

More particularly, embodiments herein include those enumerated in the EMBODIMENTS section, which is incorporated by reference into this SUMMARY.

LIST OF DRAWINGS

Figure 7:
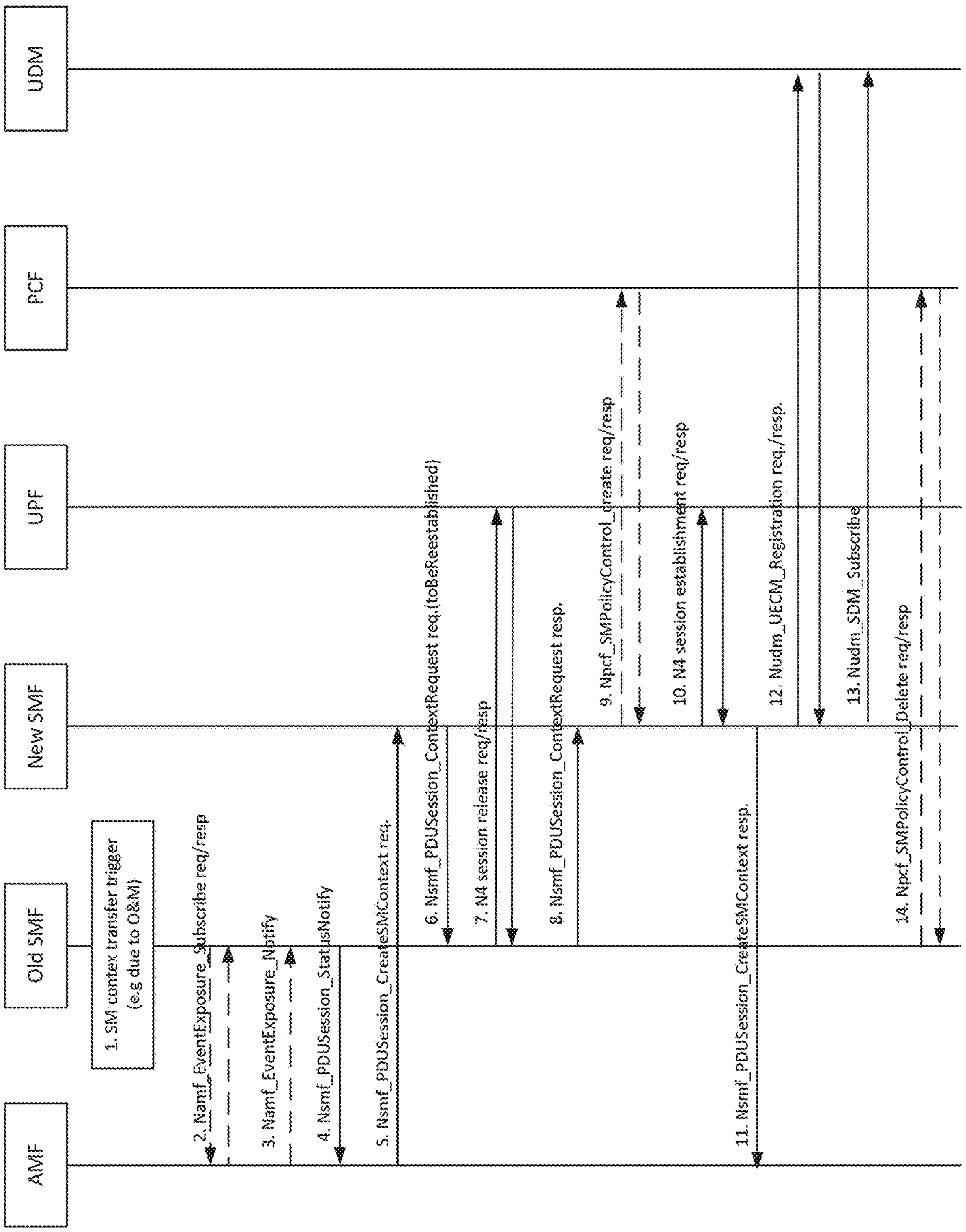

FIG. 7 captures some embodiments of the modified transfer procedure.

Figure 8:
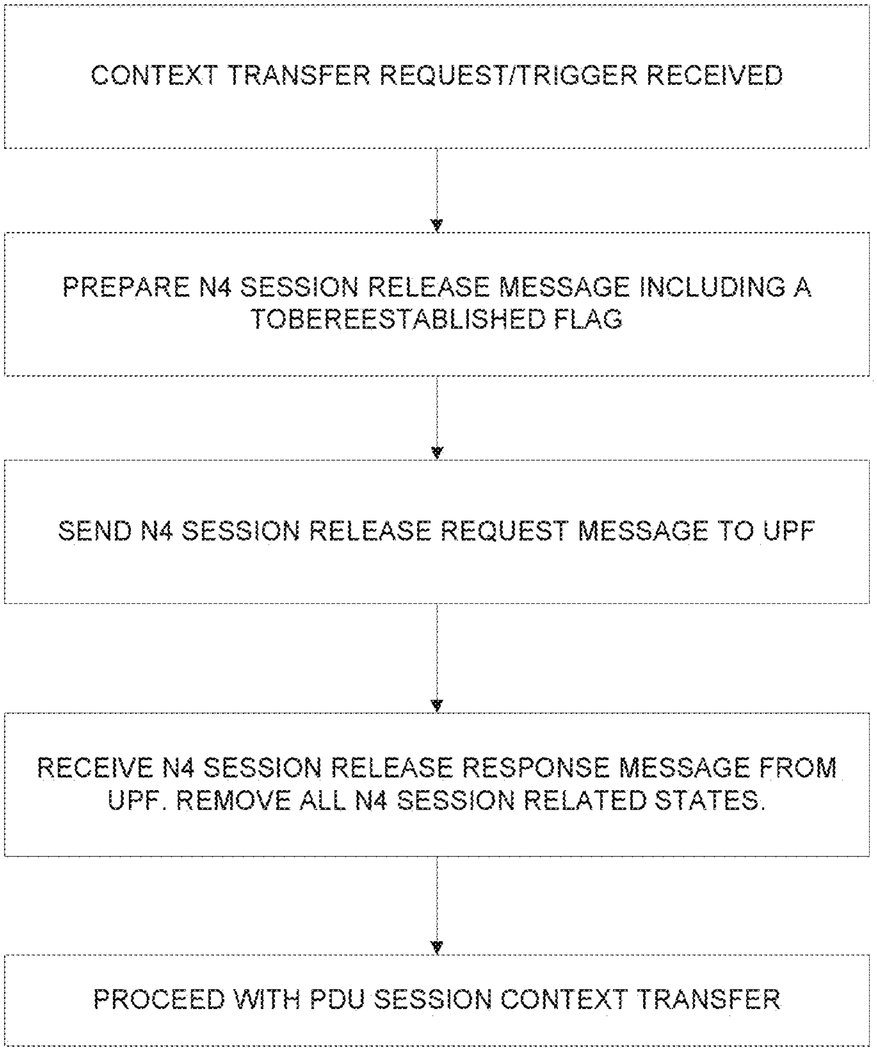

FIG. 8 shows SMF functionality according to some embodiments.

Figure 9:
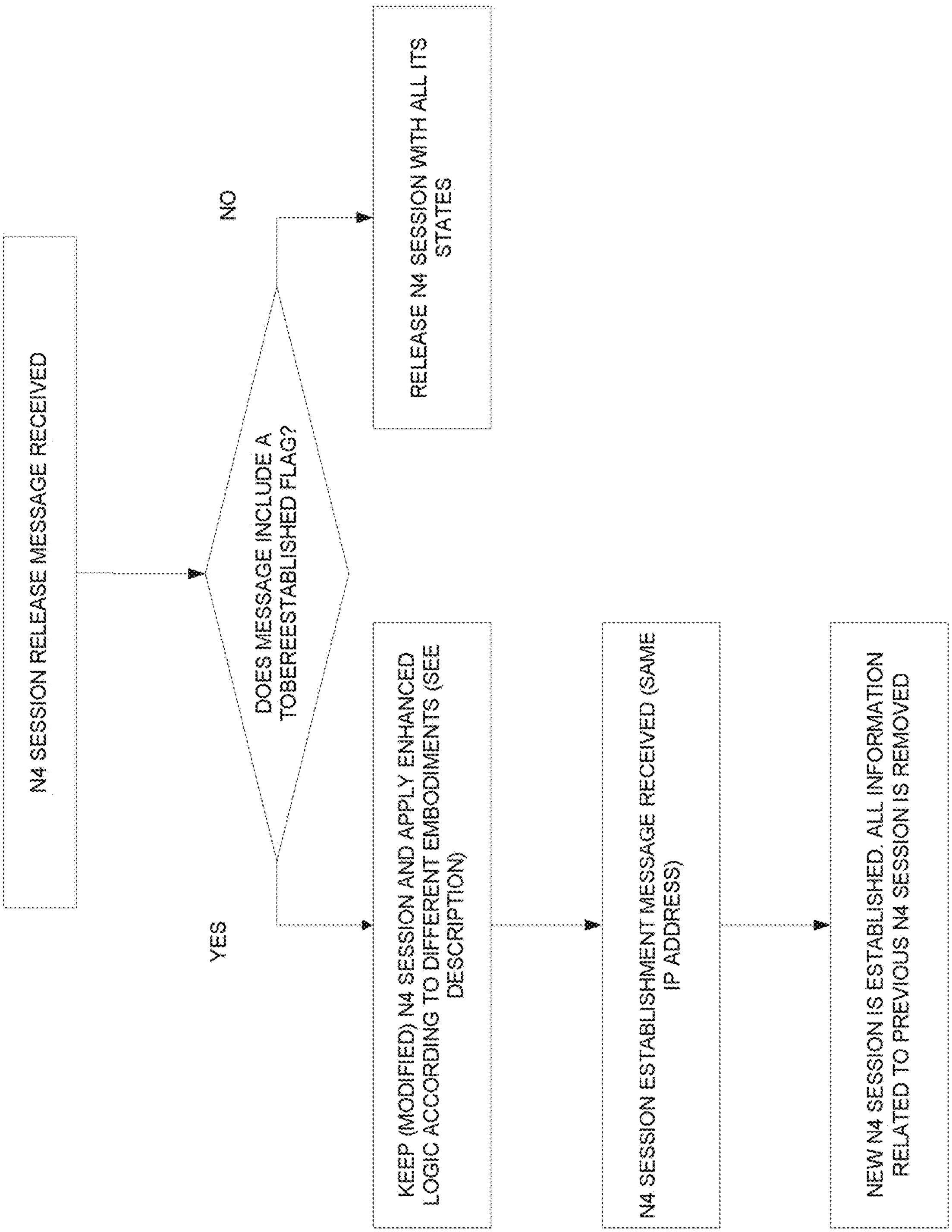

FIG. 9 shows UPF functionality according to some embodiments.

Figure 10:
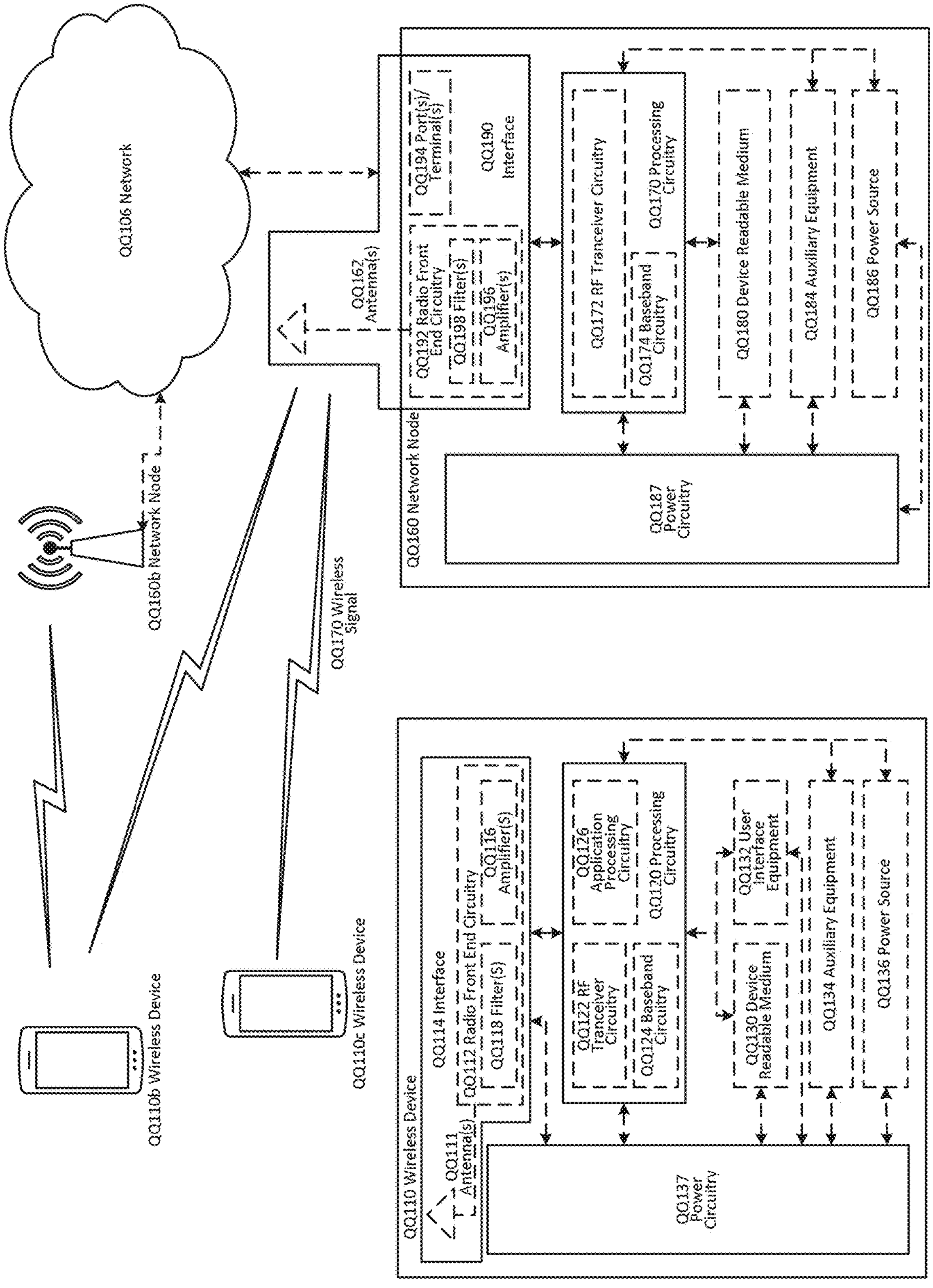
Figure 11:
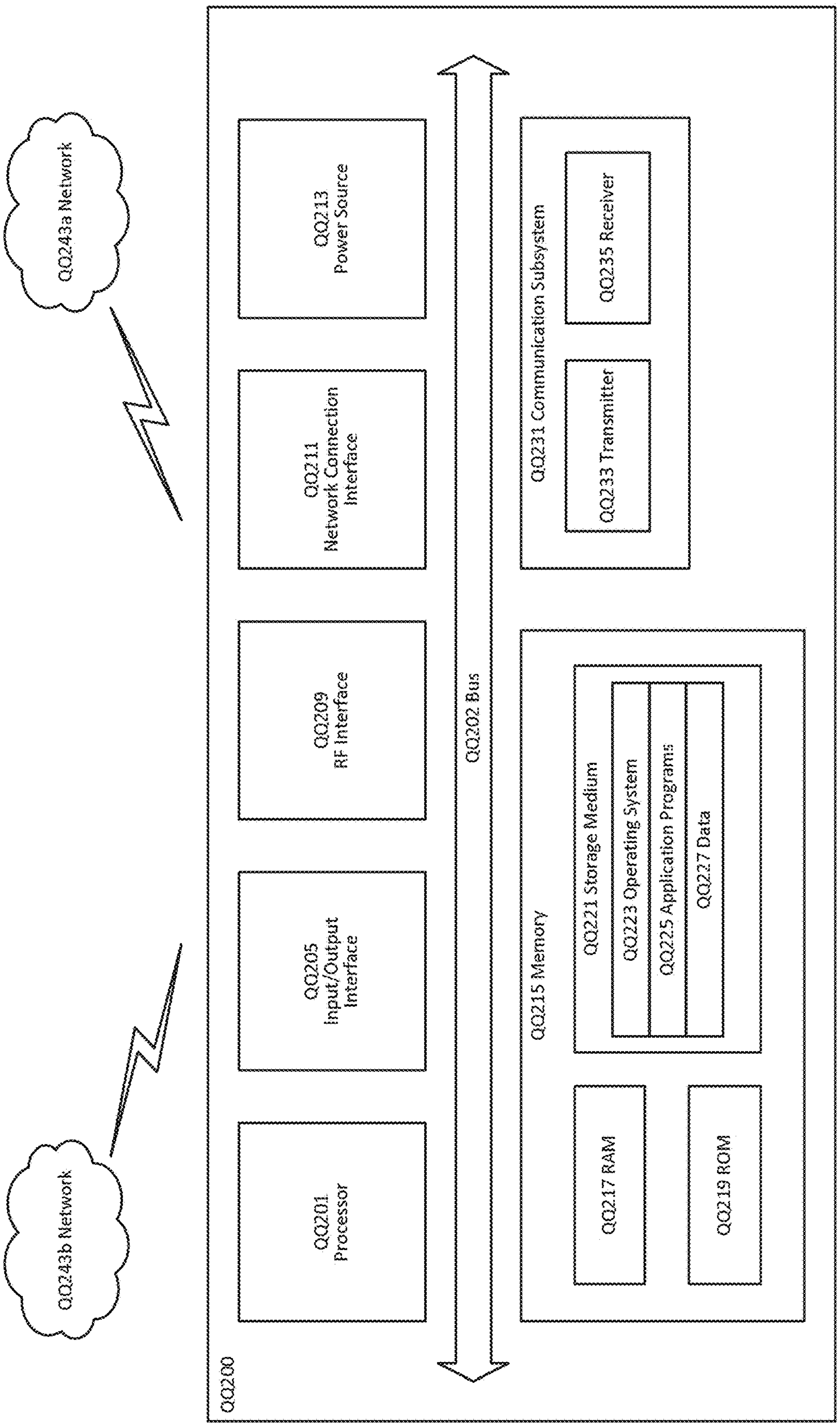
Figure 12:
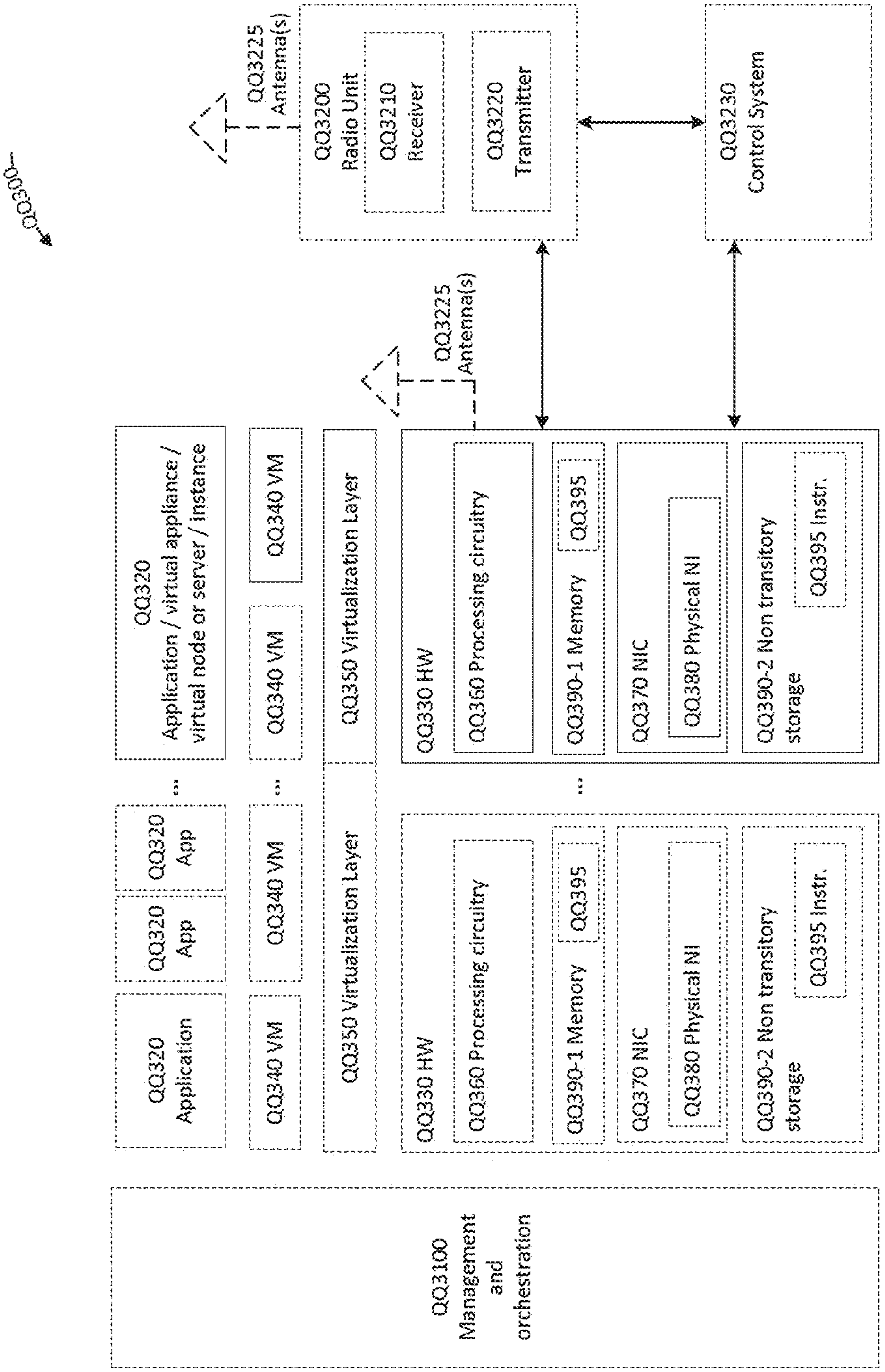
Figure 13:
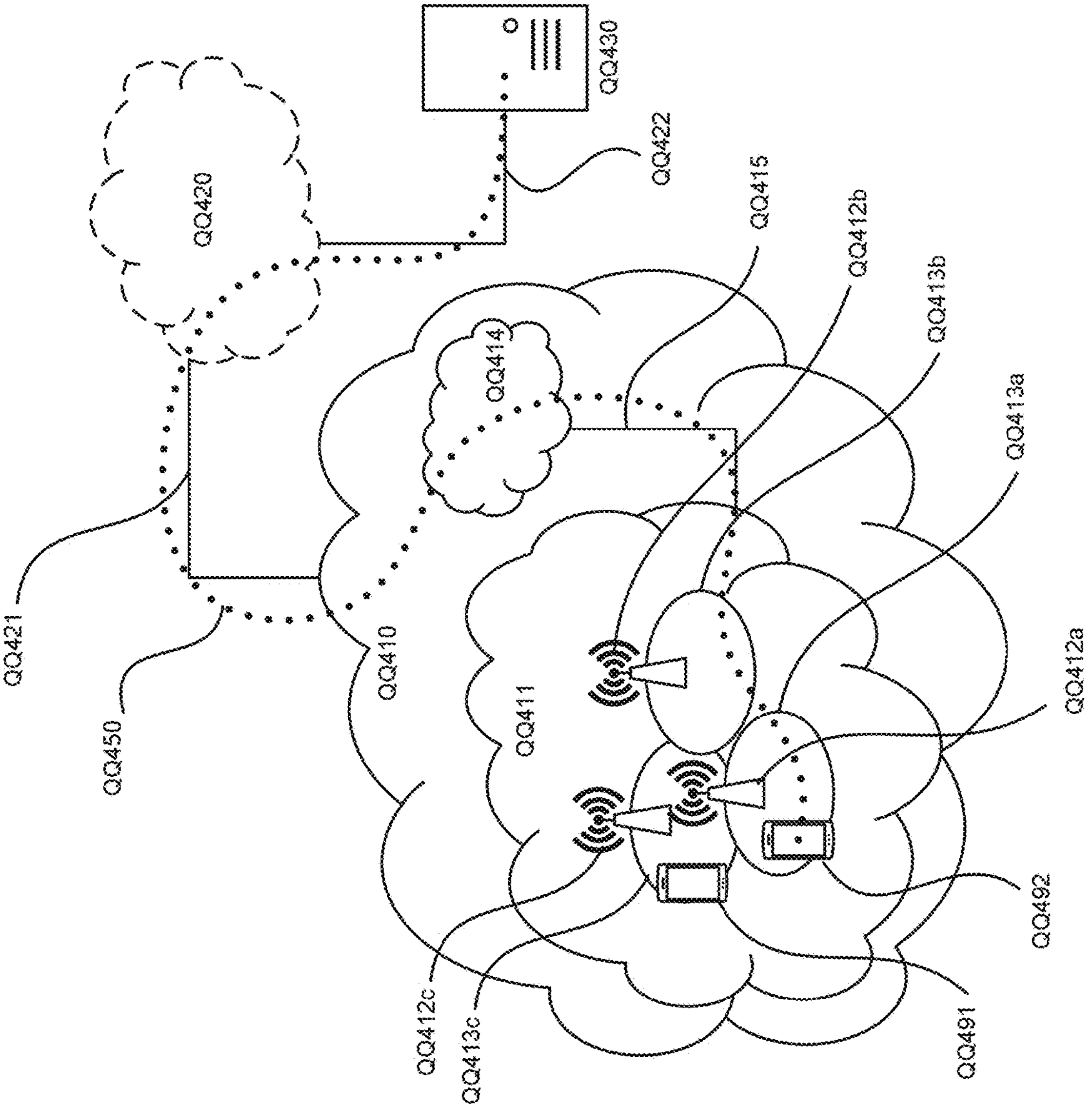
Figure 14:
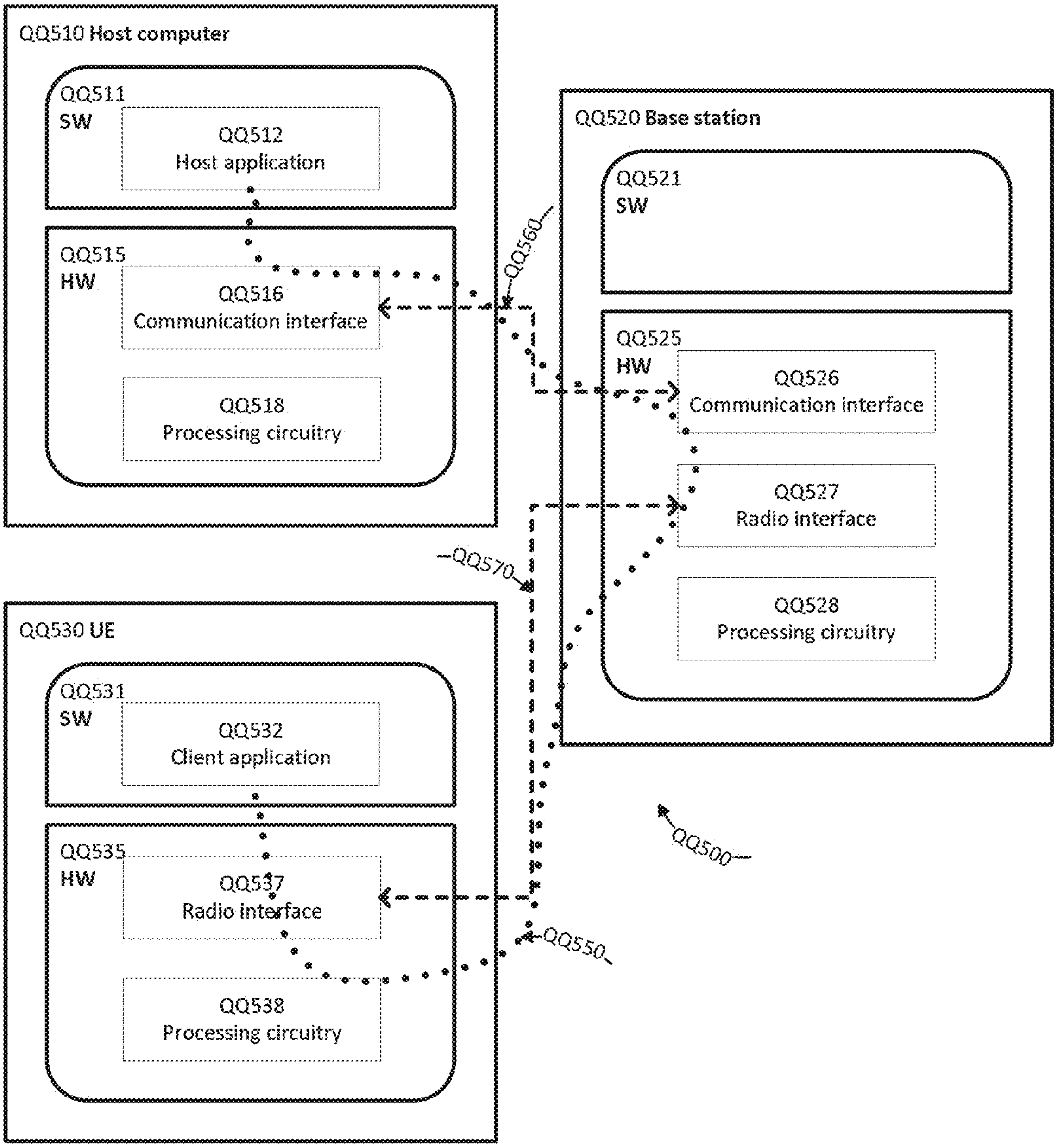
Figure 15:
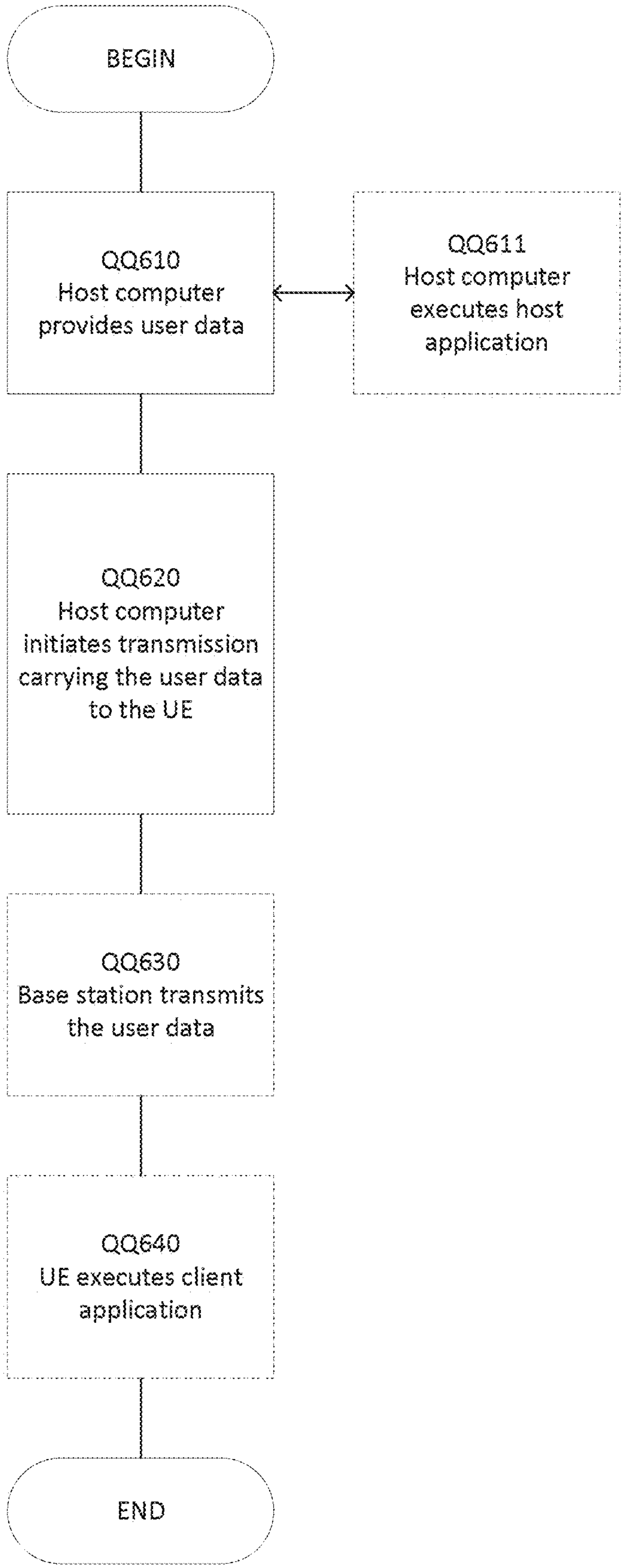
Figure 16:
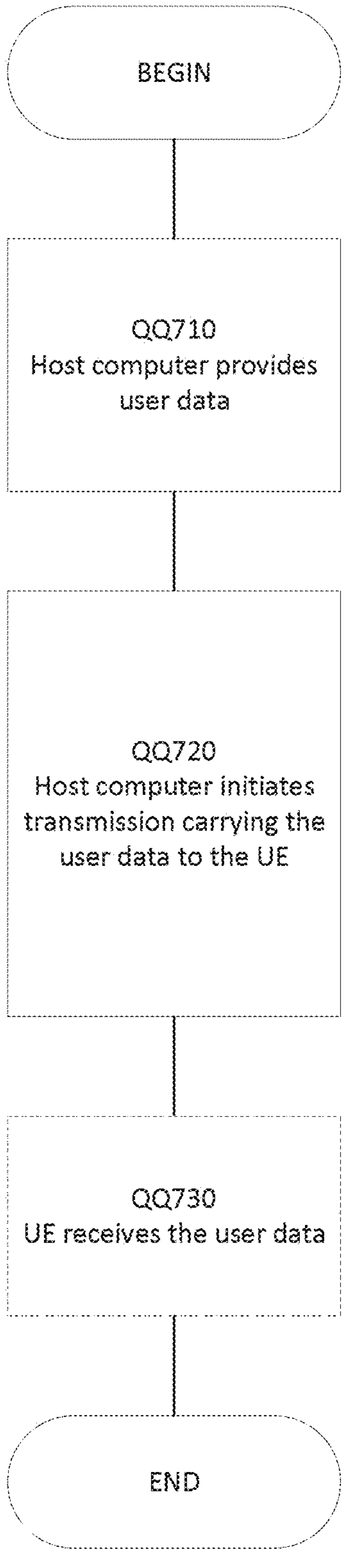
Figure 17:
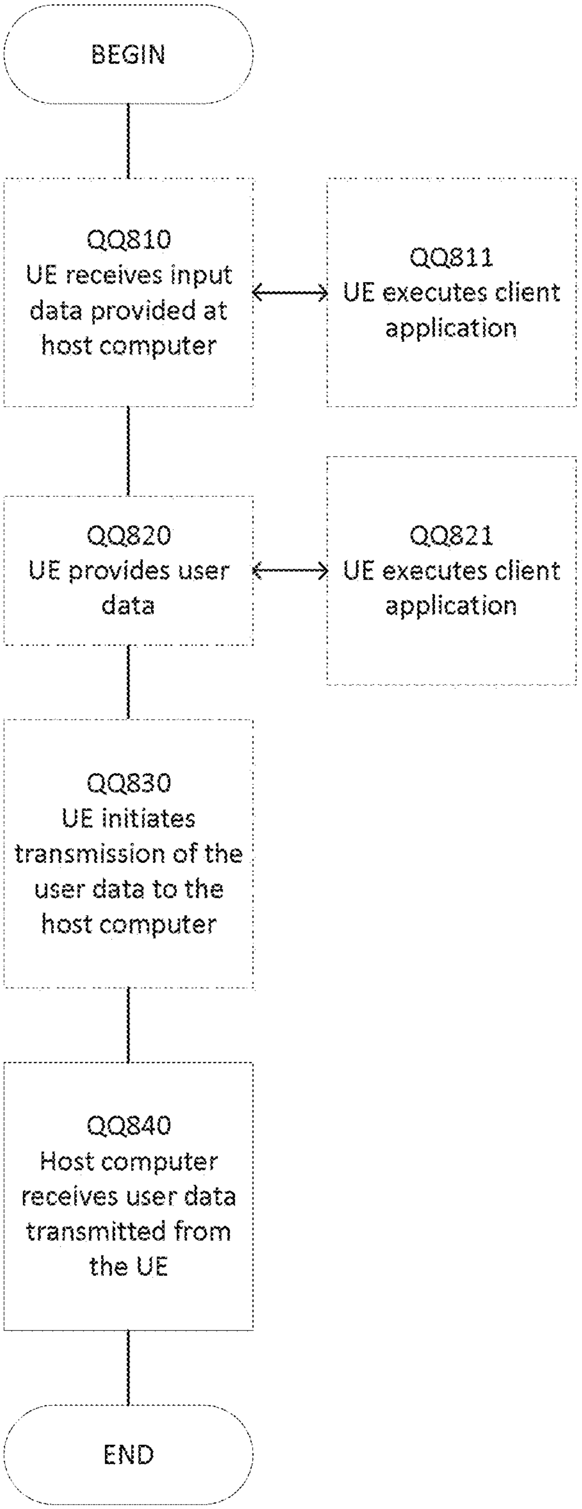
Figure 18:
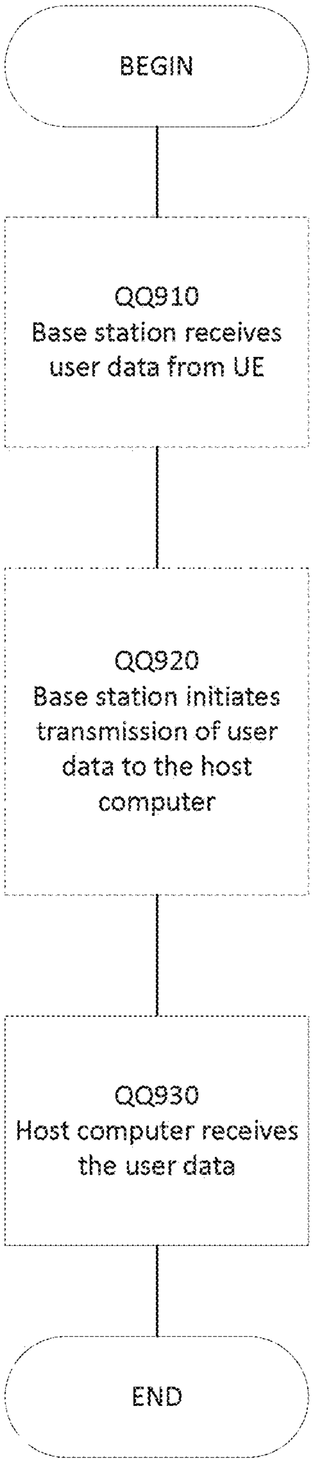

FIG. 10 is a block diagram of a wireless network in accordance with some embodiments;

FIG. 11 is a block diagram of a user equipment in accordance with some embodiments FIG. 12 is a block diagram of a virtualization environment in accordance with some embodiments;

FIG. 13 is a block diagram of a telecommunication network connected via an intermediate network to a host computer in accordance with some embodiments;

FIG. 14 is a block diagram of a host computer communicating via a base station with a user equipment over a partially wireless connection in accordance with some embodiments;

FIG. 15 is a block diagram of methods implemented in a communication system including a host computer, a base station and a user equipment in accordance with some embodiments;

FIG. 16 is a block diagram of methods implemented in a communication system including a host computer, a base station and a user equipment in accordance with some embodiments;

FIG. 17 is a block diagram of methods implemented in a communication system including a host computer, a base station and a user equipment in accordance with some embodiments; and FIG. 18 is a block diagram of methods implemented in a communication system including a host computer, a base station and a user equipment in accordance with some embodiments.

DETAILED DESCRIPTION

Figure 1A:
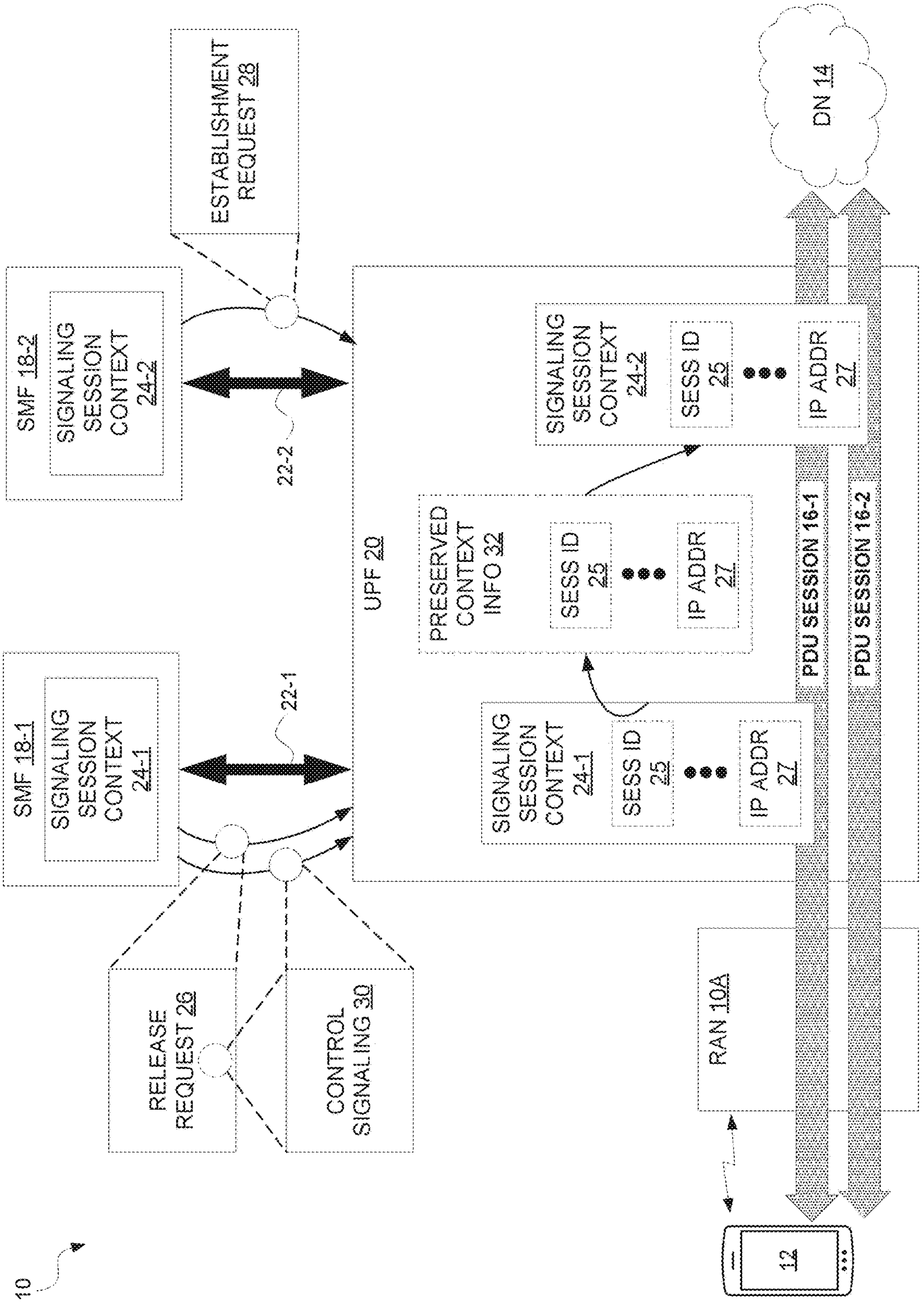
FIG. 1A shows a wireless communication system according to some embodiments.

FIG. 1A shows a wireless communication system 10 (e.g., a 5G system) according to some embodiments. The system 10 includes an access network (AN) 10A (e.g., a radio access network, RAN) that provides access to a wireless device 12 (e.g., a user equipment). The system 10 may also include a core network (CN) which interconnects the system 10 to a data network (DN) 14, e.g., the Internet.

With the system 10 interconnected to the DN 14, the wireless device 12 may establish a protocol data unit (PDU) session 16-1 with the DN 14. The PDU session 16-1 is a logical connection between the wireless device 12 and the DN 14, and may also be generically referred to as a packet session. FIG. 1A shows a session management function (SMF) 18-1 (e.g., in the CN) configured to manage the PDU session 16-1. Session management may involve for instance establishing, modifying, and/or releasing the PDU session 16-1. In some embodiments, the SMF 18-1 may also allocate an Internet Protocol (IP) address to the wireless device 12 for the PDU session 16-1. The SMF 18-1 may alternatively or additionally select and control a user plane function (UPF) 20 to handle the user plane path of the PDU session 16-1 (and to serve as an external PDU session point of interconnect to the DN 14). The UPF 20 in this role may be responsible for packet routing and forwarding, as well as packet inspection of quality of service (QoS) handling for the PDU session 16-1.

As part of serving in these roles for the PDU session 16-1, the SMF 18-1 and the UPF 20 establish a signalling session 22-1 between themselves for communication related to the PDU session 16-1. The signalling session 22-1 may be viewed as a relation or association between the SMF 18-1 and UPF 20 which is specific for signaling to support the PDU session 16-1. The signalling session 22-1 may for instance describe the handling of the user plane of the PDU session 16-1 in the UPF 20. In some embodiments where the system 10 is a 5G system, the signalling session 22-1 may be an N4 session established over an N4 interface between the UPF 20 and SMF 18-1, where the N4 interface is the bridge between the control plane and the user plane, and is the control for PDU session management and traffic steering towards the UPF and PDU usage and event reporting towards the SMF. Regardless, the UPF 20 and SMF 18-1 each store a context 24-1 for the signalling session 24-1. The context 24-1 includes information for the signalling session 22-1 such as a session identifier 25 and/or an Internet Protocol (IP) address 27 for the PDU session 16-1 on an interface between the UPF 20 and the DN 14. The context 24-1 in this regard may alternatively or additionally include information identifying a radio-side tunnel for the PDU session 16-1 between the UPF 20 and the (R)AN 10A and/or a DN-side tunnel for the PDU session 16-1 between the UPF 20 and the DN 14. The context 24-1 alternatively or additionally may include policy rules regarding packet handling, forwarding and usage reporting for the PDU session 16-1, e.g., where the rules may originate from a policy control function (PCF) not shown. Such policy rules may include for instance a packet detection rule, a forwarding action rule, a QoS enforcement rule, a usage reporting rule, a buffering action rule, or the like.

At some point, though, the system 10 triggers the SMF 18-1 to transfer PDU session management responsibility for the wireless device 12 to a new SMF 18-2. This may occur for instance due to decommissioning of the SMF 18-1. Regardless of the reason for its occurrence, session management responsibility transfer could be realized by introducing a new procedure for SMF 18-1 to transfer the signalling session context 24-1 to the new SMF 18-2, and introducing a new procedure for SMF 18-1 to modify the context 24-1 at the UPF 20 so that the context 24-1 is associated with the new SMF 18-2 instead of the old SMF 18-1. This would avoid having to set up a new signalling session between the UPF 20 and the new SMF 18-2 from scratch. But the new procedures would unnecessarily introduce signalling overhead, contribute to processing complexity, and jeopardize backwards compatibility. Rather than introducing these complicated new transfer/modification procedures, then, some embodiments advantageously enhance the relatively simple procedures for session establishment and release in a way that realizes the efficiencies of signalling session transfer/modification, without the associated complexity and backwards compatibility problems.

According to some embodiments, for example, SMF 18-1 transmits to the UPF 20 a request 26 to release the signalling session 22-1 that is established between the UPF 20 and the SMF 18-1 for the PDU session 16-1. This request 26 to release the signalling session 22-1 amounts to a request to remove the signalling session context 24-1 at the UPF 20. The new SMF 18-2 by contrast transmits to the UPF 20 a request 28 to establish a new signalling session 22-2 between the UPF 20 and the SMF 18-2, i.e., for a new PDU session 16-2 between the wireless device 12 and the DN 14. The new signalling session 22-2 will correspondingly have a new signalling session context 24-2 at the new SMF 18-2 and the UPF 20.

Notably, though, the SMF 18-1 according to some embodiments transmits to the UPF 20 certain control signalling 30, e.g., included in or otherwise associated with the request 26 to release the signalling session 22-1. The control signalling 30 in some embodiments indicates that the signalling session 22-1 (whose release is requested) will be re-established with the UPF 20, e.g., as a new signalling session 22-2 with a new SMF 18-2 taking over responsibility for PDU session management for the wireless device 12. In this sense, re-establishment of the signalling session 22-1 may mean that the signalling session 22-1 is to be replaced with a forthcoming, new signalling session 22-2 which will bear some semblance to the old signalling session 22-1. In one embodiment, for instance, this means that the new signalling session context 24-2 will have at least some information common with the old signalling session context 24-1. The control signalling 30 in some embodiments may thereby effectively indicate or suggest to the UPF 20 that at least some information from the context 24-1 of the signalling session 22-1 whose release is requested can be exploited or be re-used for forming the context 24-2 of the forthcoming signalling session 22-2. Generally, then, the control signalling 30 may indicate that the signalling session 22-1 will be re-established with the UPF 20, that a new signalling session 22-2 related to the old signalling session 22-1 will be established with the UPF 20, or that the UPF 20 is to take some action (e.g., information preservation) with respect to the signalling session 22-1.

In any event, based on this control signalling 30, the UPF 20 in some embodiments at least temporarily preserves at least some information from the signalling session context 24-1, despite the request 26 to release the signalling session 22-1. That is, rather than immediately and completely removing the signalling session context 24-1 as would occur without the control signalling 30, the UPF 20 temporarily keeps storing at least some information from that signalling session context 24-1. FIG. 1A shows for instance that the information 32 preserved by the UPF 20 includes the session identifier 24 identifying the signalling session 22-1 and the IP address for the PDU session 16-1 on the interface between the UPF 20 and the DN 14. Although not shown, the preserved information 32 may alternatively or additionally include information identifying a radio-side tunnel between the UPF 20 and a radio network node in the AN 10A and/or information identifying a DN-side tunnel between the UPF 20 and the DN 14. No matter the particular information preserved, the UPF 20 may preserve this information 32 until the signalling session 22-1 is re-established, or until a threshold amount of time has passed allowing for such re-establishment.

With at least some information 32 from the signalling session context 24-1 preserved in this way, the UPF 20 according to some embodiments exploits that information 32 for handling the request 28 from the new SMF 18-2 for the new signalling session 22-2. The UPF 20 may for instance determine that the new signalling session 22-2 requested by the received request 28 is to effectively re-establish the old signalling session 22-1, by determining that one or more parameter values in the information 32 preserved matches one or more parameter values in the request 28. The parameter values may include for instance the session ID, the IP address for the PDU session on the interface between the UPF 20 and the DN 14, and/or tunnel identifier(s) for the radio-side tunnel and/or the DN-side tunnel for the PDU session. No matter how the UPF 20 accomplishes this, though, the UPF 20 may in some embodiments use the preserved information 32 for handling re-establishment of the signalling session 22-1, e.g., as the new signalling session 22-2 with the new SMF 18-2. For example, the UPF 20 may efficiently form the new signalling session context 24-2 from the preserved information 32, rather than forming the new signalling session context 24-2 from scratch. As shown in FIG. 1A, then, the new signalling session 22-2 may be identified by the same session identifier 25 as the old signalling session 22-1 and/or be associated with the same PDU session IP address 28 as the old signalling session 22-1. Alternatively or additionally, the UPF 20 may form the new signalling session context 24-2 to have the same packet counter value(s) as the old signalling session context 24-1, e.g., which may in some embodiments even be updated to account for any packets forwarded/buffered in the interim between the old SMF 18-1 releasing the signalling session 22-1 and the new SMF 18-2 re-establishing the signalling session 22-1 as the new signalling session 22-2.

Alternatively or additionally in this regard, the UPF 20 according to some embodiments may exploit the preserved information 32 in other ways during the interim between the old SMF 18-1 releasing the signalling session 22-1 and the new SMF 18-2 re-establishing the signalling session 22-1 as the new signalling session 22-2. For example, the UPF 20 may use the preserved information 32 to handle a packet that the UPF 20 receives during the interim (i.e., after receiving the release request 26 but before receiving the establishment request 28). The UPF 20 may for instance route or forward the packet using the preserved information 32. For example, where the preserved information 32 includes information identifying a radio-side tunnel for the PDU session 16-1, the UPF 20 may forward the received packet in that radio-side tunnel, rather than dropping or delaying the packet because no signalling session 22-1 or PDU session 16-1 is established. Similarly, where the preserved information 32 includes information identifying a DN-side tunnel for the PDU session 16-1, the UPF 20 may forward the received packet in that DN-side tunnel.

Alternatively or additionally, the UPF 20 may buffer the packet until the signalling session is re-established. Such buffering may thereby earmark the packet as being associated with the old signalling session 22-1, the old PDU session 16-1, the forthcoming signalling session 22-2, and/or the forthcoming PDU session 16-2, so that the packet can be forwarded appropriately once re-establishment occurs.

According to one embodiment in a 5G system, for example, the UPF 20 handles (e.g., buffers or forwards) the IP packets with a specific N6 IP address associated with the old signalling session 22-1. If a new signalling session 22-2 is established with the same N6 IP address, then any buffered packets are released and/or any packets already forwarded in the interim according to the preserved information 32 are counted in the new signalling session's packet counter.

Some embodiments thereby effectively realize signalling session re-establishment using control signalling 30 associated with session release, so as to avoid introducing dedicated session modification procedures. In doing so, some embodiments advantageously preserve service continuity, reduce signalling overhead, minimize processing complexity, and/or maintain backward compatibility with respect to the interaction between the SMF and UPF 20.

Figure 1B:
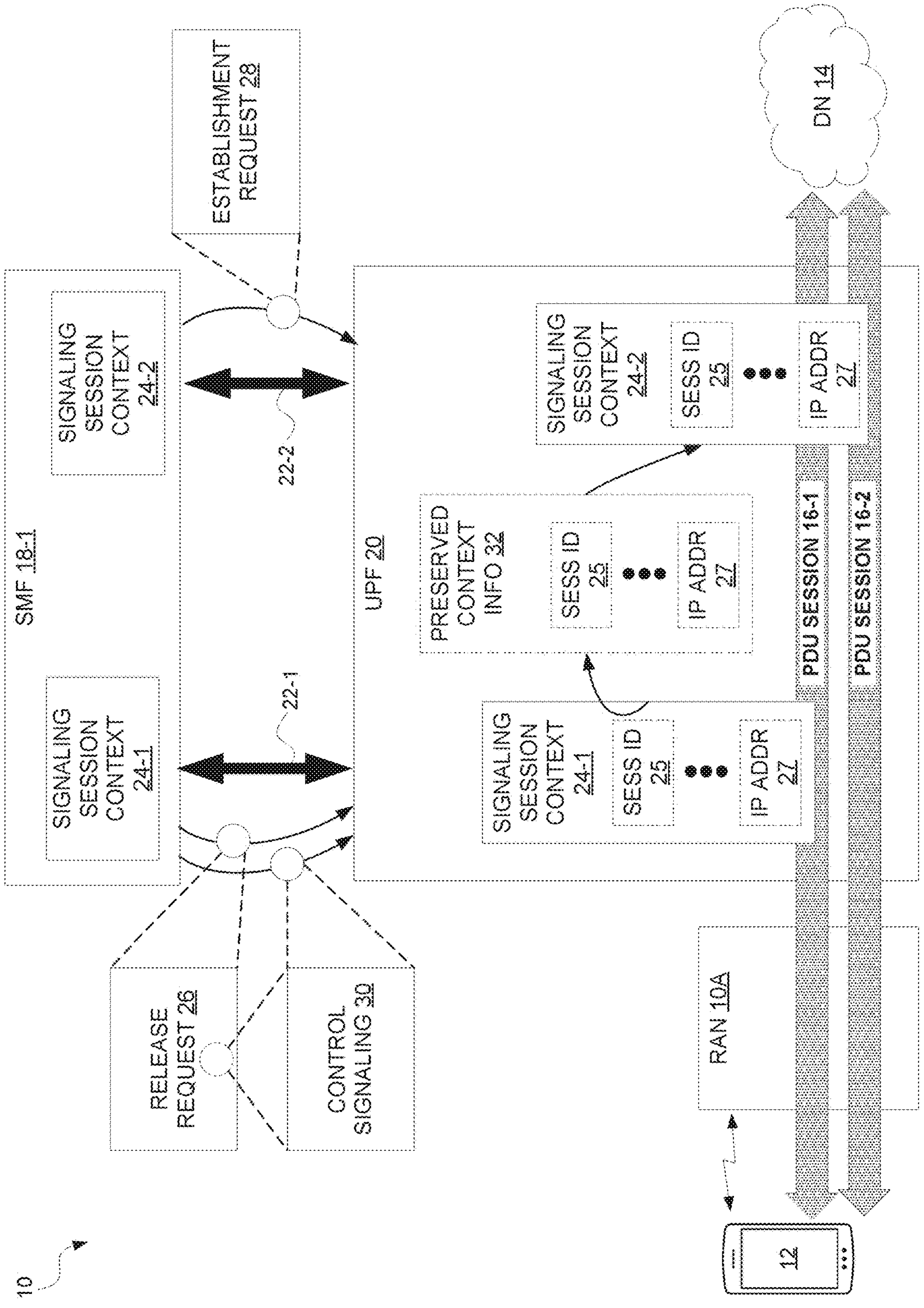
FIG. 1B shows other embodiments where the same SMF re-establishes the signalling session.

Although FIG. 1A showed a new SMF 18-2 re-establishing the signalling session 22-1 as the new signalling session 22-2, FIG. 1B shows other embodiments where the same SMF 18-1 is the entity that re-establishes the signalling session 22-1 as the new signalling session 22-2. This may occur for instance where the signalling session 22-1 relates to a cellular Internet of Things (cIoT) session which is "put on hold" while the wireless device 12 operates in a sleep mode. The UPF 20 may therefore behave and function as described above for FIG. 1A, irrespective of whether the signalling session 22-1 is to be re-established by a different SMF 18-2 or by the same SMF 18-1 with which the signaling session 22-1 is already established. For example, the UPF 20 may preserve the context information 32 as described above, for use in handling packets during the interim between the signalling session 22-1 being released and re-established and/or for use in forming the new signaling session context 24-2. According to some embodiments, then, the control signalling 30 as described above may or may not specify which SMF the signalling session 22-1 is to be re-established with, e.g., as the UPF 20 behaves the same in either case. In other embodiments, though, the control signalling 30 does specify the SMF with which the signalling session 22-1 is to be re-established, so that the UPF 20 may operate in different ways depending on whether the signalling session 22-1 is to be re-established with the same or a different SMF.

According to one 5G example of the embodiments in FIG. 1B, the UPF 20 based on the control signalling 30 effectively flushes the N4 rules in the signalling session context 24-1 related to a cIoT session while the wireless device 12 is operating in a sleep state. The SMF 18-1 then sends the N4 rules again when the wireless device 12 returns to an active/awake state. These and other embodiments may thereby reduce computational and memory demands on the UPF 20, as the UPF 20 need maintain a fewer number of states for the signalling session 22-1 while the device 12 operates in the sleep state.

Figure 2:
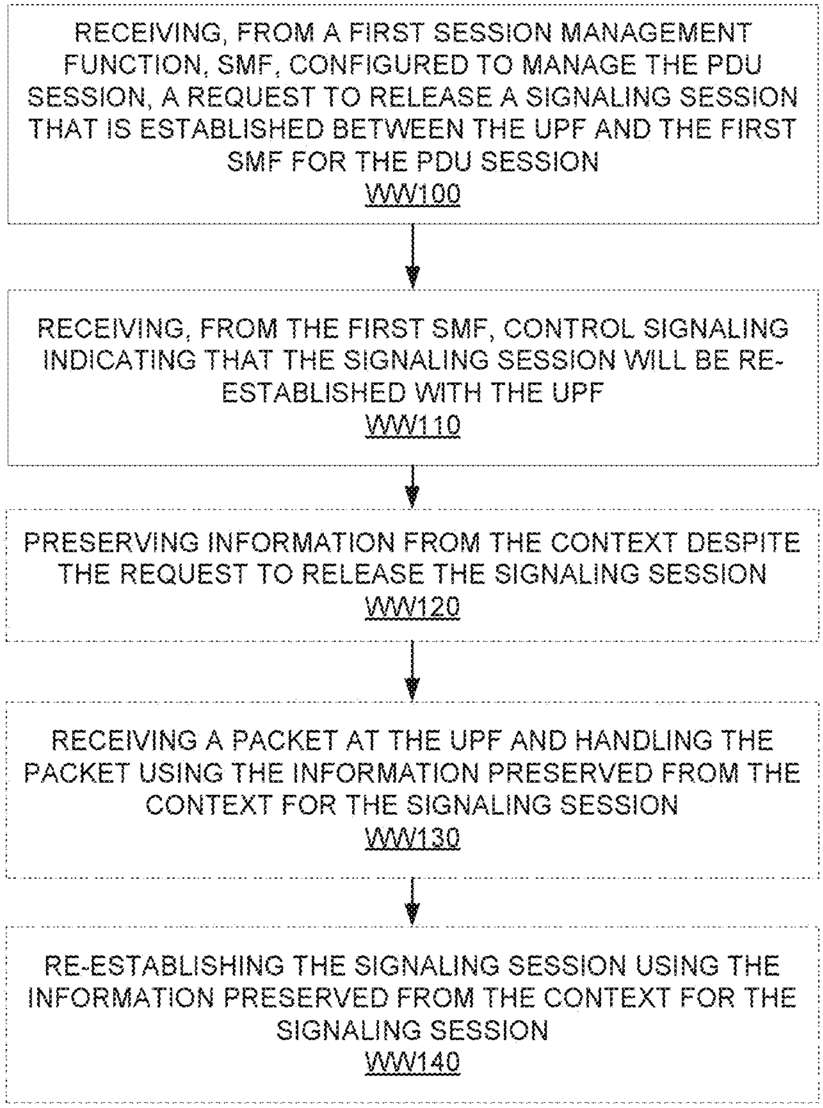
FIG. 2 depicts a method performed by network equipment configured to implement a UPF.

In view of the above modifications and variations, FIG. 2 depicts a method performed by network equipment configured to implement a UPF 20 which handles a user plane path of a PDU session 16-1 between a wireless device 12 and a DN 14, in accordance with particular embodiments. The method includes receiving, from a first SMF 18-1 configured to manage the PDU session 16-1, a request 26 to release a signaling session 22-1 that is established between the UPF 20 and the first SMF 18-1 for the PDU session 16-1 (Block WW100). The method further includes receiving, from the first SMF 18-1, control signaling 30 indicating that the signaling session 22-1 will be re-established with the UPF 20 (Block WW110). In some embodiments, the control signaling 30 is included in or otherwise associated with the request 26.

In some embodiments, the method further includes, based on the control signaling 30, preserving information 32 from the context 24-1 despite the request 26 to release the signaling session 22-1 (Block WW120). In this case, the method may also include receiving a packet at the UPF 20 and handling the packet using the information 32 preserved from the context 24-1 for the signaling session 22-1 (Block WW130). Alternatively or additionally, the method may include re-establishing the signaling session using the information 32 preserved from the context 24-1 (Block WW140).

Figure 3:
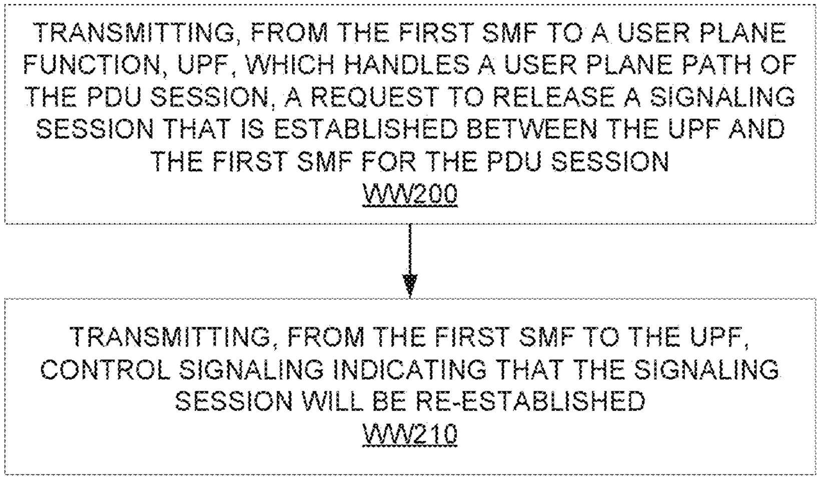
FIG. 3 depicts a method performed by network equipment configured to implement a first SMF.

FIG. 3 depicts a method performed by network equipment configured to implement a first SMF 18-1 which manages a PDU 16-1 session between a wireless device 12 and a DN 14, in accordance with other particular embodiments. The method includes transmitting, from the first SMF 18-1 to a UPF 20, which handles a user plane path of the PDU session 16-1, a request 26 to release a signaling session 22-1 that is established between the UPF 20 and the first SMF 18-1 for the PDU session 16-1 (Block WW200). The method also includes transmitting, from the first SMF 18-1 to the UPF 20, control signaling 30 indicating that the signaling session 22-1 will be re-established (Block WW210). In some embodiments, the control signaling 30 is included in or otherwise associated with the request 26.

In some embodiments, the control signaling 30 is transmitted based on receipt of a transfer request which requests that the first SMF transfer to a second SMF a session management context at the first SMF for the PDU session. In other embodiments, the control signaling 30 is transmitted based on determination that the wireless device 12 is operating in a sleep state.

Note that the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 4:
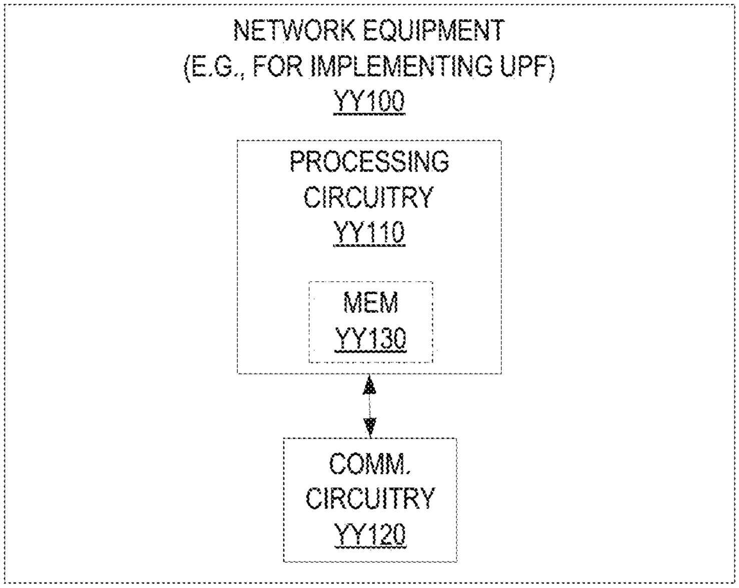
FIG. 4 illustrates network equipment configured to implement a UPF in accordance with one or more embodiments.

FIG. 4 for example illustrates network equipment YY100 configured to implement a UPF 20 as implemented in accordance with one or more embodiments. As shown, the network equipment YY100 includes processing circuitry YY110 and communication circuitry YY120. The communication circuitry YY120 is configured to transmit and/or receive information to and/or from one or more other nodes, e.g., via any communication technology. The processing circuitry YY110 is configured to perform processing described above, e.g., in FIG. 2, such as by executing instructions stored in memory YY130. The processing circuitry YY110 in this regard may implement certain functional means, units, or modules.

Figure 5:
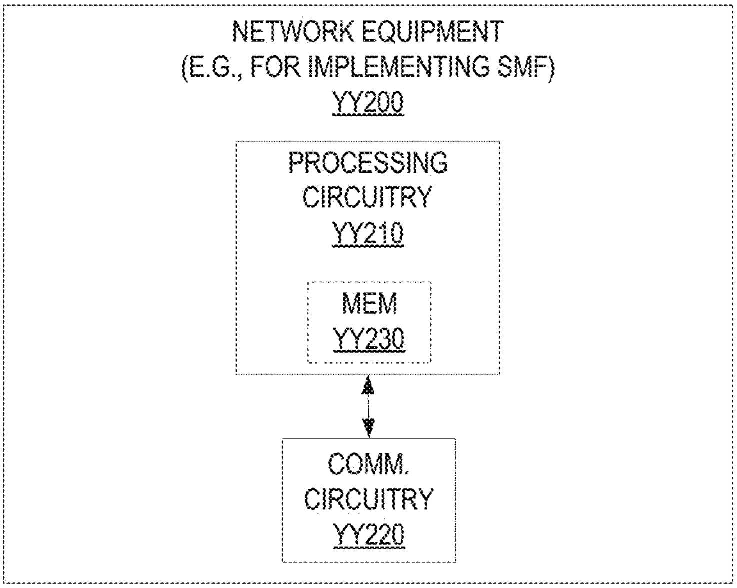
FIG. 5 illustrates network equipment configured to implement a first SMF in accordance with one or more embodiments.

FIG. 5 illustrates network equipment YY200 configured to implement a first SMF 18-1 as implemented in accordance with one or more embodiments. As shown, the network node YY200 includes processing circuitry YY210 and communication circuitry YY220. The communication circuitry YY220 is configured to transmit and/or receive information to and/or from one or more other nodes, e.g., via any communication technology. The processing circuitry YY210 is configured to perform processing described above, e.g., in FIG. 3, such as by executing instructions stored in memory YY230. The processing circuitry YY210 in this regard may implement certain functional means, units, or modules.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Note that although some embodiments herein have been described with respect to a session management function (SMF), e.g., in the context of a 5G system, the role of the SMF as described may be implemented by any physical, logical, or functional node or entity configured to manage the PDU session 16. Where the above description references an SMF, then, that description may be generalized to any session manager that comprises a node or entity configured to manage the PDU session 16.

Similarly, although some embodiments herein have been described with respect to a user plane function (UPF), e.g., in the context of a 5G system, the role of the UPF as described may be implemented by any physical, logical, or functional node or entity configured to handle the user plane path of the PDU session 16. Where the above description references a UPF, then, that description may be generalized to any user plane node or entity configured to handle the user plane path of the PDU session 16.

Additional embodiments will now be described. At least some of these embodiments may be described as applicable in certain contexts and/or wireless network types for illustrative purposes, but the embodiments are similarly applicable in other contexts and/or wireless network types not explicitly described.

The next generation (5G) networks architecture is defined in the new 3GPP Rel15. See 3GPP TS 23.502, V16.0.2 Procedures for the 5G System; Stage 2. A key aspect in which the 3GPP networks will differ starting from Release 15 is that the core network (CN) architecture is mostly built around the Service Based Architecture (SBA) paradigm. That is, there will be a network domain (basically the core network, CN) in which the different functional components are defined as Services, which are self-contained functionalities that can be changed and modified in an isolated manner (without affecting the others).

The services in 5G CN (5GC) will likely be built in a stateless way, i.e., the business logic and data context will be separated. This means that the services store their context externally in a proprietary database. This will enable various cloud infrastructure features like auto-scaling or auto-healing.

Apart from that, services will be deployed as part of a NF (Network Function), and multiple NF instances may be deployed in a Set, as long as these instances have access to the same context data. The intention by an operator is to deploy at least two different Sets of the same NF type, each one possibly by different vendors, and then, have the chance to transfer some information related to the context stored in Set1 (e.g. user equipment, UE, or/and protocol data unit, PDU, session related) to Set2 with the intention to continue handling the context at Set 2. The context data that is required to be transferred may vary, but in any case, it should be enough to allow the target Set (Set2) to re-build the processing state as close as it was in Set1; that is, to allow the target to restore internal business logic state in order to continue processing.

NFs may include for instance a Session Management Function (SMF) responsible for session management, an Access and Mobility Function (AMF) responsible for mobility management, and a User Plane Function (UPF) responsible for handling the user plane path. The SMF and UPF may interact over an N4 interface. The UPF may interact with the access network (e.g., RAN) over an N3 interface, and interact with a Data Network (DN) over an N6 interface.

Figure 6:
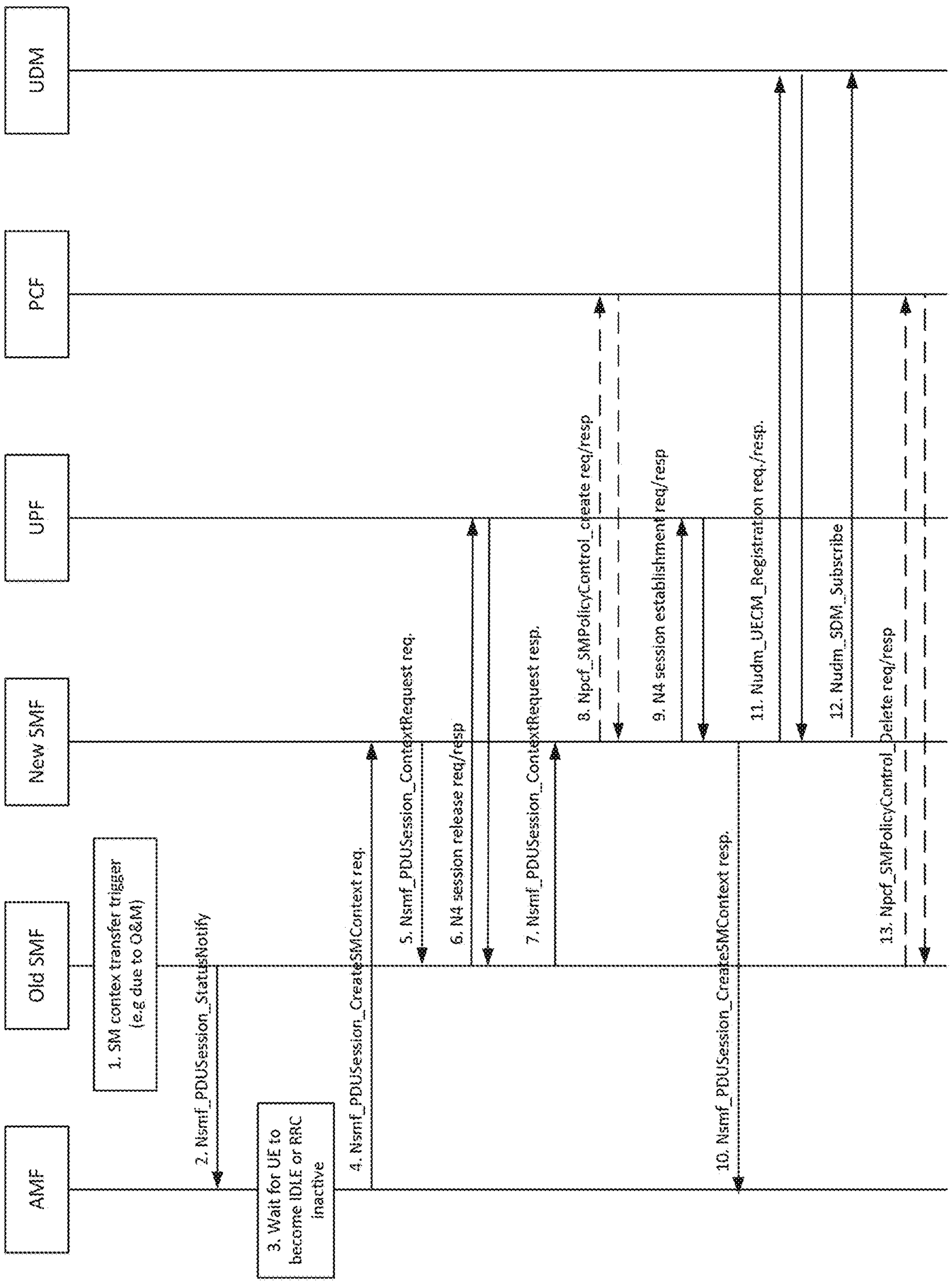
FIG. 6 shows an approach for Session Management Function (SMF) context transfer.

One approach for Session Management Function (SMF) context transfer is shown in FIG. 6 and described below. See also 3GPP TS 23.502 CR1325: SMF context transfer, S2-1906744.

1. Session Management (SM) context transfer is triggered, e.g. by Operations and Maintenance (OAM) including Subscription Permanent Identifier (SUPI), PDU session ID and New SMF ID.
2. From Old SMF to AMF Nsmf_PDUSession_StatusNotify (SMF transfer indication, New SMF ID
3. The Access and Mobility Function (AMF) waits until UE becomes IDLE or Radio Resource Control (RRC) inactive.
4. AMF uses New SMF ID to select New SMF and sends Nsmf_PDU_Session_CreateSMContext request (PDU Session ID, SM Context ID, UE location info, Access Type, Radio Access Technology Type, Operation Type, SMF transfer indication). The same PDU Session ID as received in step 1 is used.
5. From New SMF to Old SMF SMF Nsmf_PDUSessionContextRequest request (SM Context type, SM Context ID, SMF transfer indication).
6. The Old SMF releases the N4 session.
7. From Old SMF to New SMF Nsmf_PDUSessionContextRequest response (SM Context). The SM Context includes the IP address(es) in case PDU session is of type IPv4, IPv6 or IPv4v6, or the Ethernet MAC address(es) in case PDU session type Ethernet.
8. [Condtitional] If dynamic PCC is used for the PDU Session, the new SMF sets up a new policy association towards PCF
9. New SMF establishes N4 session. The parameters from step 7 and, if applies, step 8 are used.
10. From New SMF to AMF: Nsmf_PDU_Session_CreateSMContext response
11. New SMF registers to Unified Data Management (UDM),
12. New SMF subscribes to subscription changes for the UE 13. [Conditional] Old SMF removes its policy association with PCF (triggered by step 7) Any changes to the QoS rules need to be sent to the UE when it becomes active. After Step 13 (Step 7 if there is no policy assiciation) the old SMF can relase any internal resources for the PDU session.

There currently exist certain challenge(s). The problem with the solution in FIG. 6 is that there is a period (between the N4 session removal by Old SMF and N4 session establishment by New SFM, i.e., Steps 6 and 9 in the sequence diagram in FIG. 6) when there is no user plane (UP) established between the UE and the UPF. This can cause service continuity problems in some cases.

For example, in one case, one or more packets from the data network (DN) destined to the UE in either state (e.g., an Internet server tries to communicate with the UE) arrives at the UPF in this period. Since there is no established N3 connection (or states for an IDLE UE) for the given IP address, the UPF will drop the packets. This could in many cases cause failure in server connections setups.

In another case, a UE originally in RRC INACTIVE mode becomes active and sends packets. The radio base station forwards the packets to the UPF, but the UPF has deleted the downlink tunnel so it will not recognize a packet as coming from a valid PDU session and will drop the packet.

In another case, e.g., when Old SMF decommissioning is needed, there could be a need to start the context transfer even if the UE is in ACTIVE state. In this case, all packets sent by and directed to the UE will be lost One solution could be to optimize or change steps 6 and 9 so that they modify the N4 session. However, such a solution would have the following consequences. The solution to change the N4 association from the old SMF to the new SMF would require updated N4 communication, e.g., in the form of a new type of N4 session modification signaling that enables change of N4 association from the Old SMF to the New SMF. Also, the solution would require new UPF functionality in Release 16, contributing to complexity of deployment. Also, a complex, N4 session related state transfer would be needed between old and new SMFs.

Certain aspects of the present disclosure and their embodiments may provide solutions to these or other challenges. Some embodiments propose an enhancement to the SMF transfer procedure that is still based on N4 session release by Old SMF and re-establishment by new SMF but can yield similar benefits as if the N4 session was not released. In some embodiments, for example, the Old SMF sends in the N4 session release message a flag indicating that the session is being transferred and/or will be shortly re-established. Based on this, an enhanced UPF will optimize the user plane handling during the context transfer by keeping some of its internal states related to the N4 session.

Some embodiments thereby propose enhanced logic in the SMF (to add a flag in N4 session release message) and enhanced logic in UPF to act on that flag to minimize service degradation or disruption during PDU session context transfer. Some embodiments do so by keeping the N4 session (and N4 association) release procedure place but add to the N4 session release request from the old SMF a re-establishment notification to the UPF. Based on this, the UPF may temporarily keep some information related to the N4 session to optimize packet handling until the N4 session is re-established by the new SMF. Note that this solution can provide backward compatibility for the UPF.

Certain embodiments may provide one or more of the following technical advantage(s). Some embodiments can minimize the impact on the UP-session performance during the context transfer procedure. Some embodiments alternatively or additionally represent a minimal complexity increase compared the current method, unlike a method that would target moving the N4 session association from one SMF to another. Moreover, some embodiments are backward compatible with the UPFs from previous releases, e.g., a legacy UPF would disregard the new flag and its actions would correspond to those in the current procedure.

Some embodiments modify the transfer procedure from FIG. 6 as follows.

Modified Step 6. The Old SMF releases the N4 session with the UPF by sending a N4 Session Release Request (N4 Session ID), where a new ToBeReestablished flag is added to the message notifying the UPF about the expected re-establishment of the N4 session for the same PDU session. One alternative is to add the ToBeReestablished flag in the GTP-U extension header of the Packet Forwarding Control Protocol (PFCP) tunnel. See 3GPP TS 29.244, V15.5.0, Interface between the Control Plane and the User Plane Nodes. In some embodiments, the flag is added as an optional information element in the Packet Forwarding Control Protocol (PFCP) communication. This may for instance be possible with the PFCP Association update messages. In this case, then, the SMF may send an N4 session update with the required flag before sending an N4 session release. But in other embodiments the SMF adds the flag to the N4 session release message. In these and other alternatives, then, legacy UPFs neglect the new attribute and process the N4 message normally. All N4 session related information is deleted in the Old SMF.

Based on the received flag, the UPF may temporarily keep some information related to the N4 session to optimize packet handling until the N4 session is re-established by the new SMF. For example, in the problem cases listed above, the following UPF functionality could apply. In the case that one or more packets from the DN destined to the UE in either state arrive to the UPF, the UPF may forward or buffer the packet. Specifically, if UE state is ACTIVE on UPF side (i.e., there is an N3 interface), then the packet is forwarded to the corresponding RBS in the corresponding N3 tunnel. If the UE state is IDLE, then the UPF buffers the received packets until the new N4 session is established to the new SMF (Step 9 in FIG. 6), and then it initiates UE paging and service request through the new SMF.

In the case that a UE originally RRC INACTIVE state becomes active and sends packets, the UPF according to some embodiments forwards the IP packet as it was an active N4 session for that UE.

In the case that a UE in ACTIVE state sends packets (the context transfer had to be started while the UE was in ACTIVE state), the UPF may apply the same treatment as above.

Note that other alternative treatment could be applied. For example, if no packet forwarding was allowed for the UPF while there was no active N4 session for the given PDU session, then the UPF could instead apply buffering of data for all the cases above and release the buffered packets to the destination when the N4 session is re-established. This also minimizes service disruption, since there will be no packets lost.

Modified Step 9. New SMF establishes a new N4 session with the UPF. The parameters from step 7 and, if applies, step 8 may be used. The UPF may use information from previous session to optimize the establishment of the new N4 session. However, all information related to previous N4 session is removed from UPF after the new N4 session is established.

FIG. 7 captures some embodiments of the modified transfer procedure.

1. SM context transfer is triggered, e.g. by OAM including SUPI, PDU session ID and New SMF ID.
2. [Conditional—depending on current subscription] Old SMF subscribes to events when UE status becomes IDLE or RRC inactive (Namf_EventExposure_Subscribe)
3. [Conditional—depending on the event] The AMF detects the monitored event occurs and sends the event report by means of Namf_EventExposure_Notify message, to the old SMF
4. From Old SMF to AMF: Nsmf_PDUSession_StatusNotify (SMF transfer indication, New SMF ID)
5. AMF uses New SMF ID to select New SMF and sends Nsmf_PDUSession_CreateSMContext request (PDU Session ID, SM Context ID, UE location info, Access Type, RAT Type, Operation Type, SMF transfer indication). The same PDU Session ID as received in step 4 is used.
6. From New SMF to Old SMF SMF Nsmf_PDUSessionContextRequest request (SM Context type, SM Context ID, SMF transfer indication).
7. The Old SMF releases the N4 session with the UPF by sending a flag (ToBeReestablished) notifying the UPF about the expected re-establishment of the N4 session for the same PDU session. Based on this, the UPF may temporarily keep some information related to the N4 session to optimize packet handling until the N4 session is re-established by the new SMF. All N4 session related information is deleted in the Old SMF.
8. From Old SMF to New SMF Nsmf_PDUSessionContextRequest response (SM Context). The SM Context includes the IP address(es) in case PDU session is of type IPv4, IPv6 or IPv4v6, or the Ethernet MAC address(es) in case PDU session type Ethernet as well as the UPF to be selected by the new SMF.
9. [Condtitional] If dynamic PCC is used for the PDU Session, the new SMF sets up a new policy association towards PCF
10. New SMF performs a full re-establishment of the session (IMS signaling, online charging etc.) and establishes a new N4 session with the UPF. The parameters from step 8 and, if applies, step 9 are used. All information related to previous N4 session is removed from UPF.

11. From New SMF to AMF: Nsmf_PDU_Session_CreateSMContext response
12. New SMF registers to UDM,
13. New SMF subscribes to subscription changes for the UE
14. [Conditional] Old SMF removes its policy association with PCF (triggered by step 7) Any changes to the QoS rules need to be sent to the UE when it becomes active. After Step 14 (Step 8 if there is no policy association) the old SMF can release any internal resources for the PDU session.

Note that the context-specific transfer procedure in FIG. 7 may be between different SMF Sets supporting the same DNN/S-NSSAI pair supported for SM Contexts (i.e. SMF contexts). Note also that, in some embodiments, in case of dynamic IP address assignment (IPv4 address and/or IPv6 prefix), the control of the IP address(es) assigned by Old SMF is moved to New SMF by O&M procedures. New SMF is in full control of the concerned IP address(es) when the transfer is complete. Also, if UPF has the IP point of presence from the DNN, the same UPF is used.

FIG. 8 shows SMF functionality according to some embodiments.

FIG. 9 shows UPF functionality according to some embodiments.

The SMF and UPF functionality proposed in Steps 6 and 9 is shown in the flow diagrams in FIGS. 6 and 7 respectively.

Note that some embodiments enable separation of service logic and data, which facilitates applying cloud-native design principles for services in the SBA domain.

Although the subject matter described herein may be implemented in any appropriate type of system using any suitable components, the embodiments disclosed herein are described in relation to a wireless network, such as the example wireless network illustrated in FIG. 10. For simplicity, the wireless network of FIG. 10 only depicts network QQ106, network nodes QQ160 and QQ160*b*, and WDs QQ110, QQ110*b*, and QQ110*c*. In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 10, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 10 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 10 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port.

Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/ or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

FIG. 11 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3*rd* Generation Partnership Project (3GPP), including a NB-IoT UE, a machine type communication (MTC) UE, and/or an enhanced MTC (eMTC) UE. UE QQ200, as illustrated in FIG. 11, is one example of a WD configured for communication in accordance with one or more communication standards promulgated by the 3*rd* Generation Partnership Project (3GPP), such as 3GPP's GSM, UMTS, LTE, and/or 5G standards. As mentioned previously, the term WD and UE may be used interchangeable. Accordingly, although FIG. 11 is a UE, the components discussed herein are equally applicable to a WD, and vice-versa.

In FIG. 11, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 11, or only a subset of the components. The level of integration between the components may vary from one UE to another UE. Further, certain UEs may contain multiple instances of a component, such as multiple processors, memories, transceivers, transmitters, receivers, etc.

In FIG. 11, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 11, RF interface QQ209 may be configured to provide a communication interface to RF components such as a transmitter, a receiver, and an antenna. Network connection interface QQ211 may be configured to provide a communication interface to network QQ243*a*. Network QQ243*a* may encompass wired and/or wireless networks such as a local-area network (LAN), a wide-area network (WAN), a computer network, a wireless network, a telecommunications network, another like network or any combination thereof. For example, network QQ243*a* may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 11, processing circuitry QQ201 may be configured to communicate with network QQ243*b* using communication subsystem QQ231. Network QQ243*a* and network QQ243*b* may be the same network or networks or different network or networks. Communication subsystem QQ231 may be configured to include one or more transceivers used to communicate with network QQ243*b*. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243*b* may encompass wired and/or wireless networks such as a local-area network (LAN), a wide-area network (WAN), a computer network, a wireless network, a telecommunications network, another like network or any combination thereof. For example, network QQ243*b* may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

FIG. 12 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 12, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 12.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

FIG. 13 illustrates a telecommunication network connected via an intermediate network to a host computer in accordance with some embodiments. In particular, with reference to FIG. 13, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412*a*, QQ412*b*, QQ412*c*, such as NBs, eNBs, gNBs or other types of wireless access points, each defining a corresponding coverage area QQ413*a*, QQ413*b*, QQ413*c*. Each base station QQ412*a*, QQ412*b*, QQ412*c* is connectable to core network QQ414 over a wired or wireless connection QQ415. A first UE QQ491 located in coverage area QQ413*c* is configured to wirelessly connect to, or be paged by, the corresponding base station QQ412*c*. A second UE QQ492 in coverage area QQ413*a* is wirelessly connectable to the corresponding base station QQ412*a*. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 13 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Example implementations, in accordance with an embodiment, of the UE, base station and host computer discussed in the preceding paragraphs will now be described with reference to FIG. 14. FIG. 14 illustrates host computer communicating via a base station with a user equipment over a partially wireless connection in accordance with some embodiments In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 14) served by base station QQ520. Communication interface QQ526 may be configured to facilitate connection QQ560 to host computer QQ510. Connection QQ560 may be direct or it may pass through a core network (not shown in FIG. 14) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 14 may be similar or identical to host computer QQ430, one of base stations QQ412*a*, QQ412*b*, QQ412*c* and one of UEs QQ491, QQ492 of FIG. 13, respectively. This is to say, the inner workings of these entities may be as shown in FIG. 14 and independently, the surrounding network topology may be that of FIG. 13.

In FIG. 14, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

FIG. 15 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 15 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

FIG. 16 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 16 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

FIG. 17 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 17 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

FIG. 18 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 18 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

EMBODIMENTS

Group A Embodiments

A1. A method performed by network equipment configured to implement a user plane function, UPF, which handles a user plane path of a protocol data unit, PDU, session between a wireless device and a data network, DN, the method comprising:
- receiving, from a first session management function, SMF, configured to manage the PDU session, a request to release a signaling session that is established between the UPF and the first SMF for the PDU session; and
- receiving, from the first SMF, control signaling indicating that the signaling session will be re-established with the UPF.

A2. The method of embodiment A1, wherein the control signaling indicates that a second SMF will re-establish the signaling session with the UPF.

A3. The method of embodiment A1, wherein the control signaling indicates that the first SMF will re-establish the signaling session with the UPF.

A4. The method of any of embodiments A1-A3, further comprising:
- before receiving the request, storing a context for the signaling session at the UPF; and
- based on the control signaling, preserving information from the context despite the request to release the signaling session.

A5. The method of embodiment A4, wherein the information preserved includes one or more of:
- an Internet Protocol, IP, address for the PDU session on an interface between the UPF and the DN;
- a device identifier identifying the wireless device;
- a session identifier identifying the signaling session; or
- information identifying a tunnel for the PDU session, wherein the tunnel is either a radio-side tunnel between the UPF and a radio network node or a DN-side tunnel between the UPF and the DN.

A6. The method of any of embodiments A4-A5, wherein said preserving comprises storing information from the context until the signaling session is re-established.

A7. The method of any of embodiments A2-A5, further comprising:
- after receiving the request, receiving a packet at the UPF; and
- handling the packet using the information preserved from the context for the signaling session.

A8. The method of embodiment A7, wherein said handling comprises forwarding the packet or buffering the packet.

A9. The method of any of embodiments A7-A8, wherein the information preserved from the context includes information identifying a tunnel for the PDU session, and wherein said handling comprises forwarding the packet in the tunnel, wherein the tunnel is either a radio-side tunnel between the UPF and a radio network node or a DN-side tunnel between the UPF and the DN.

A10. The method of any of embodiments A7-A9 wherein said handling comprises buffering the packet until the signaling session is re-established.

A11. The method of any of embodiments A2-A10, further comprising re-establishing the signaling session.

A12. The method of embodiment A11, wherein said re-establishing comprises re-establishing the signaling session using the information preserved from the context.

A13. The method of any of embodiments A1-A12, wherein the signaling session as re-established is identified by the same session identifier as the signaling session established between the UPF and the first SMF and/or is associated with the same PDU session IP address on an interface between the UPF and the DN.

A14. The method of any of embodiments A1-A13, wherein the control signaling is included in the request.

A15. The method of any of embodiments A1-A13, wherein the control signaling is included in a request from the first SMF to update or modify the signaling session.

A16. The method of any of embodiments A1-A15, wherein the control signaling comprises an information element in a Packet Forwarding Control Protocol, PFCP, communication from the first SMF.

A17. The method of any of embodiments 1A-A16, wherein the control signaling is included in a Generic Tunneling Protocol, GTP, User Plane extension header of a Packet Forwarding Control Protocol, PFCP, tunnel established between the first SMF and the UPF.

A18. The method of any of embodiments A1-A17, wherein the control signaling comprises a flag whose presence indicates the signaling session will be re-established.

Group B Embodiments

B1. A method performed by network equipment configured to implement a first session management function, SMF, which manages a protocol data unit, PDU, session between a wireless device and a data network, DN, the method comprising:

transmitting, from the first SMF to a user plane function, UPF, which handles a user plane path of the PDU session, a request to release a signaling session that is established between the UPF and the first SMF for the PDU session; and transmitting, from the first SMF to the UPF, control signaling indicating that the signaling session will be re-established.

B2. The method of embodiment B1, further comprising receiving a transfer request which requests that the first SMF transfer to a second SMF a session management context at the first SMF for the PDU session, and wherein the control signaling is transmitted based on receipt of the transfer request.

B3. The method of embodiment B1, further comprising determining that the wireless device is operating in a sleep state, and wherein the control signaling is transmitted based on said determining.

B4. The method of any of embodiments B1-B3, wherein the signaling session as will be re-established is identified by the same session identifier as the signaling session established between the UPF and the first SMF, and/or is associated with the same PDU session IP address on an interface between the UPF and the DN.

B5. The method of any of embodiments B1-B4, wherein the control signaling is included in the request.

B6. The method of any of embodiments B1-B4, wherein the control signaling is included in a request from the first SMF to update or modify the signaling session.

B7. The method of any of embodiments B1-B6, wherein the control signaling comprises an information element in a Packet Forwarding Control Protocol, PFCP, communication from the first SMF.

B8. The method of any of embodiments B1-B7, wherein the control signaling is included in a Generic Tunneling Protocol, GTP, User Plane extension header of a Packet Forwarding Control Protocol, PFCP, tunnel established between the first SMF and the UPF.

B9. The method of any of embodiments B1-B8, wherein the control signaling comprises a flag whose presence indicates the signaling session will be re-established.

Group C Embodiments

C1. Network equipment configured to perform any of the steps of any of the Group A or B embodiments.

C2. Network equipment comprising processing circuitry configured to perform any of the steps of any of the Group A or B embodiments.

C3. Network equipment comprising:

communication circuitry; and processing circuitry configured to perform any of the steps of any of the Group A or B embodiments.

C4. Network equipment comprising:

processing circuitry configured to perform any of the steps of any of the Group A or B embodiments; and power supply circuitry configured to supply power to the network equipment.

C5. Network equipment comprising:

processing circuitry and memory, the memory containing instructions executable by the processing circuitry whereby the network equipment is configured to perform any of the steps of any of the Group A or B embodiments.

C6. A computer program comprising instructions which, when executed by at least one processor of network equipment, causes the network equipment to carry out the steps of any of the Group A or B embodiments.

C7. A carrier containing the computer program of embodiment C6, wherein the carrier is one of an electronic signal, optical signal, radio signal, or computer readable storage medium.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

5GC 5th Generation Core Network
AMF Access and Mobility Management Function
DN Data Network
NF Network Function
PDU Packet Data Unit
SBA Service based Architecture
SMF Session Management Function
UE User Equipment
UP User Plane
UPF User Plane Function
1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)

E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method performed by network equipment configured to implement a user plane function (UPF) which handles a user plane path of a protocol data unit (PDU) session between a wireless device and a data network (DN), the method comprising:

receiving, from a first session management function (SMF) configured to manage the PDU session, an N4 session release request to release an N4 session between the UPF and the first SMF for the PDU session, the request including a flag indicating that the N4 session for the PDU session will be re-established with the UPF;

based on the flag, delaying the release of the N4 session; and receiving, from the first or a further SMF, a request to re-establish the N4 session for the PDU session.

2. The method of claim 1, wherein the flag indicates that a second SMF will re-establish the N4 session with the UPF.

3. The method of claim 1, wherein the flag indicates that the first SMF will re-establish the N4 session with the UPF.

4. The method of claim 1, wherein said delaying comprises delaying the release of the N4 session at least until re-establishment of the N4 session.

5. The method of claim 1, further comprising, after receiving the N4 session release request, storing the context for the N4 session at the UPF at least until the N4 session is re-established.

6. The method of claim 1, further comprising:

before receiving the N4 session release request, storing the context for the sign N4 session at the UPF;

after receiving the N4 session release request to release the signaling session, receiving a packet for the PDU session at the UPF; and handling the packet using information from the stored context for the N4 session.

7. The method of claim 6, wherein the information used includes information identifying a tunnel for the PDU session, and wherein said handling comprises forwarding the packet in the tunnel, wherein the tunnel is either a radio-side tunnel between the UPF and a radio network node or a DN-side tunnel between the UPF and the DN.

8. The method of claim 1, further comprising re-establishing the N4 session, wherein said re-establishing comprises re-establishing the N4 session using information from the stored context.

9. The method of claim 1, wherein the N4 session to be re-established is identified by the same session identifier as the N4 session established between the UPF and the first SMF and/or is associated with the same PDU session IP address on an interface between the UPF and the DN.

10. A method performed by network equipment configured to implement a first session management function (SMF), which manages a protocol data unit (PDU) session between a wireless device and a data network (DN), the method comprising:

transmitting, from the first SMF to a user plane function (UPF), which handles a user plane path of the PDU session, an N4 session release request to release an N4 session between the UPF and the first SMF for the PDU session, the request including a flag indicating that the N4 session for the PDU session will be re-established with the UPF and the UPF shall delay the release of the N4 session.

11. The method of claim 10, further comprising receiving a transfer request which requests that the first SMF transfer to a second SMF a session management context at the first SMF for the PDU session, and wherein the flag is transmitted based on receipt of the transfer request.

12. The method of claim 10, further comprising determining that the wireless device is operating in a sleep state, and wherein the flag is transmitted based on said determining.

13. The method of claim 10, wherein the N4 session to be re-established is identified by the same session identifier as the N4 session established between the UPF and the first SMF, and/or is associated with the same PDU session IP address on an interface between the UPF and the DN.

14. Network equipment configured to implement a user plane function (UPF) which handles a user plane path of a protocol data unit (PDU) session between a wireless device and a data network (DN), the network equipment comprising:

communication circuitry; and processing circuitry configured to:

receive, from a first session management function (SMF) configured to manage the PDU session, an N4 session release request to release an N4 session between the UPF and the first SMF for the PDU session, the request including a flag indicating that the N4 session for the PDU session will be re-established with the UPF;

based on the flag, delay the release of the N4 session; and receive, from the first or a further SMF, a request to re-establish the N4 session for the PDU session.

15. The network equipment of claim 14, wherein the flag indicates that a second SMF will re-establish the N4 session with the UPF.

16. The network equipment of claim 14, wherein the flag indicates that the first SMF will re-establish the N4 session with the UPF.

17. The network equipment of claim 14,, wherein the processing circuitry is configured to delay the release of the N4 session at least until re-establishment of the N4 session.

18. The network equipment of claim 14, wherein the processing circuitry is further configured to, after receiving the N4 session release request, store the context for the N4 session at the UPF at least until the N4 session is re-established.

19. The network equipment of claim 14, wherein the processing circuitry is further configured to:

before receiving the N4 session release request, store the context for the sign N4 session at the UPF;

after receiving the N4 session release request to release the signaling session, receive a packet for the PDU session at the UPF; and handle the packet using information from the stored context for the N4 session.

20. The network equipment of claim 19, wherein the information used includes information identifying a tunnel for the PDU session, and wherein the processing circuitry is configured to forward the packet in the tunnel, wherein the tunnel is either a radio-side tunnel between the UPF and a radio network node or a DN-side tunnel between the UPF and the DN.

21. The network equipment of claim 14, wherein the processing circuitry is further configured to re-establish the N4 session using information from the stored context.

22. The network equipment of claim 14, wherein the N4 session to be re-established is identified by the same session identifier as the N4 session established between the UPF and the first SMF and/or is associated with the same PDU session IP address on an interface between the UPF and the DN.

23. Network equipment configured to implement a first session management function (SMF), which manages a protocol data unit (PDU) session between a wireless device and a data network (DN), the network equipment comprising:

communication circuitry; and processing circuitry configured to transmit, from the first SMF to a user plane function (UPF), which handles a user plane path of the PDU session, an N4 session release request to release an N4 session between the UPF and the first SMF for the PDU session, the request including a flag indicating that the N4 session for the PDU session will be re-established with the UPF and the UPF shall delay the release of the N4 session.

24. The network equipment of claim 23, the processing circuitry further configured to receive a transfer request which requests that the first SMF transfer to a second SMF a session management context at the first SMF for the PDU session, wherein the processing circuitry is configured to transmit the flag based on receipt of the transfer request.

25. The network equipment of claim 23, the processing circuitry further configured to make a determination that the wireless device is operating in a sleep state, wherein the processing circuitry is configured to transmit the flag based on said determination.

26. The network equipment of claim 23, wherein the N4 session to be re-established is identified by the same session identifier as the N4 session established between the UPF and the first SMF, and/or is associated with the same PDU session IP address on an interface between the UPF and the DN.

* * * * *